United States Patent
Ricard et al.

(10) Patent No.: US 11,900,639 B2
(45) Date of Patent: Feb. 13, 2024

(54) PROCESSING A POINT CLOUD

(71) Applicant: InterDigital VC Holdings, Inc., Wilmington, DE (US)

(72) Inventors: Julien Ricard, Cesson-Sevigne (FR); Celine Guede, Cesson-Sevigne (FR); Yannick Olivier, Cesson-Sevigne (FR); Joan Llach Pinsach, Cesson-Sevigne (FR); David Gendron, Chevaigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 752 days.

(21) Appl. No.: 16/962,908

(22) PCT Filed: Jan. 21, 2019

(86) PCT No.: PCT/IB2019/050492
§ 371 (c)(1),
(2) Date: Jul. 17, 2020

(87) PCT Pub. No.: WO2019/142164
PCT Pub. Date: Jul. 25, 2019

(65) Prior Publication Data
US 2021/0056730 A1 Feb. 25, 2021

(30) Foreign Application Priority Data

Jan. 19, 2018 (EP) .................... 18305048
Apr. 10, 2018 (EP) .................... 18305420
Jul. 11, 2018 (EP) .................... 18305928

(51) Int. Cl.
*G06K 9/36* (2006.01)
*G06T 9/00* (2006.01)
(Continued)

(52) U.S. Cl.
CPC ............ *G06T 9/00* (2013.01); *H04N 19/184* (2014.11); *H04N 19/186* (2014.11)

(58) Field of Classification Search
CPC .. G06T 9/00; G06T 9/001; G06T 9/40; G06T 2207/10028; G06T 15/08; G06T 15/005;
(Continued)

(56) References Cited

U.S. PATENT DOCUMENTS 6,963,671 B2 11/2005 Frisken et al.
9,342,867 B2 5/2016 Lee et al.
(Continued)

FOREIGN PATENT DOCUMENTS

CN 106471805 A 3/2017
CN 107004134 A 8/2017
(Continued)

OTHER PUBLICATIONS

Song et al. ("Progressive Transmission of Pointtexture 3-D Images", 2016 IEEE, pp. 485-488 (Year: 2016).*
(Continued)

*Primary Examiner* — Duy M Dang
(74) *Attorney, Agent, or Firm* — CONDO ROCCIA KOPTIW LLP

(57) ABSTRACT

At least one embodiment relates to a method for adding at least one 3D sample to a point cloud frame and for assigning a color-coding mode to said at least one 3D sample, said color-coding mode indicating if color information associated with said at least one 3D sample is explicitly encoded in a bitstream or if said color information is implicit.

19 Claims, 13 Drawing Sheets

(51) Int. Cl.
*H04N 19/184* (2014.01)
*H04N 19/186* (2014.01)

(58) Field of Classification Search
CPC ...... G06T 15/00; H04N 19/184; H04N 19/96; H04N 19/597; H04N 19/70; H04N 19/186; H04N 19/132
See application file for complete search history.

(56) References Cited

U.S. PATENT DOCUMENTS

| | | | |
|---|---|---|---|
| 9,594,974 | B2 | 3/2017 | Fu et al. |
| 9,607,388 | B2 | 3/2017 | Lin et al. |
| 9,716,889 | B2 | 7/2017 | Ikeda |
| 10,070,115 | B2 | 9/2018 | Graziosi et al. |
| 11,455,748 | B2 * | 9/2022 | Cai .................. G06T 17/00 |
| 2003/0138048 | A1 | 7/2003 | Hall et al. |
| 2005/0244065 | A1 | 11/2005 | Malvar et al. |
| 2015/0326864 | A1 | 11/2015 | Lainema |
| 2017/0214943 | A1 | 7/2017 | Cohen et al. |
| 2017/0347055 | A1 * | 11/2017 | Dore .................... G06T 7/90 |
| 2017/0347122 | A1 | 11/2017 | Chou et al. |
| 2018/0053324 | A1 * | 2/2018 | Cohen .............. G06T 9/001 |
| 2018/0190016 | A1 | 7/2018 | Yang |
| 2018/0293744 | A1 * | 10/2018 | Yu .................. H04N 13/246 |
| 2019/0200046 | A1 * | 6/2019 | Lucas .............. H04N 19/176 |

FOREIGN PATENT DOCUMENTS

| | | |
|---|---|---|
| CN | 107230225 A | 10/2017 |
| CN | 107590825 A | 1/2018 |
| JP | 2004038933 A | 2/2004 |
| JP | 2009301361 A | 12/2009 |
| JP | 2017529620 A | 10/2017 |

OTHER PUBLICATIONS

He et al., "Best-effort Projection Based Attribute Compression for 3D Point Cloud", 2017 23rd Asia-Pacific Conference on Communications (APCC), Perth, Australia, Dec. 11, 2017, 6 pages.

Anonymous, "Reference software for ITU-T H.265 high efficiency video coding", International Telecommunication Union, Series H: Audiovisual and Multimedia Systems Infrastructure of audiovisual services—Coding of moving video, Recommendation ITU-T H.265. 2, Oct. 2014, 12 pages.

Khaled Mammou (Ed.), "PCC Test Model Category 2 v0", International Organization for Standardization, ISO/IEC JTC1/SC29/WG11, Coding of Moving Picture and Audio, Document N17248, Macau, China, Oct. 2017, 11 pages.

Song et al., "Progressive Compression and Transmission of Point-Texture Images", Journal of Visual Communication & Image Representation, vol. 17, No. 5, Oct. 1, 2006, pp. 1090-1107.

Huang et al., "A Generic Scheme for Progressive Point Cloud Coding", IEEE Transactions on Visualization and Computer Graphics, vol. 14, No. 2, Mar.-Apr. 2008, pp. 440-453.

Lasserre, Sebastien et al., "Technicolor Response to the CfP on PCC (Cat 2) based on a hybrid image/geometry scheme", 120. MPEG Meeting; Oct. 23, 2017-Oct. 27, 2017; Macau; (Motion Picture Expert Group or ISO/IEC JTC1/SC29/WG11), No. m41822 Oct. 21, 2017 (Oct. 21, 2017), XP030260585, Oct. 2017, 28 pages.

English Language PatDoc Translation, Japanese Publication No. JP2009301361A.

Hoppe et al., "Surface Reconstruction from Unorganized Points", Proceedings of the 19th Annual Conference on Computer Graphics and Interactive Techniques, Jul. 1992, pp. 71-78.

ISO/IEC, "Text of ISO/IEC CD 23090 5: Video-based Point Cloud Compression", 3DG subgroup, ISO/IEC JTC1/SC29/WG11 N18030, Macau, China, Oct. 2018, 73 pages.

ITU-T, "High Efficiency Video Coding", Recommendation ITU-T H.265 Standard, Series H: Audiovisual and Multimedia Systems, Infrastructure of Audiovisual Services—Coding of Moving Video, Dec. 2016, 664 pages.

Ricard, J., "[V-PCC] V-PCC Test Model v4", Technicolor, ISO/IEC JTC1/SC29/WG11 MPEG2018/m460xx, Macau, CH, Oct. 2018, 3 pages.

ISO/IEC 13818-2, "Information Technology—Generic Coding of Moving Pictures and Associated Audio Information: Video", ITU-T H.262; Jul. 1995, 255 pages.

Xin et al., "The New Generation of Scalable Video Coding Standard: Background, Features, Techniques and Applications", Journal of Electronic Measurement and Instrument, vol. 29, No. 10, Oct. 15, 2015, pp. 1415-1423.

* cited by examiner

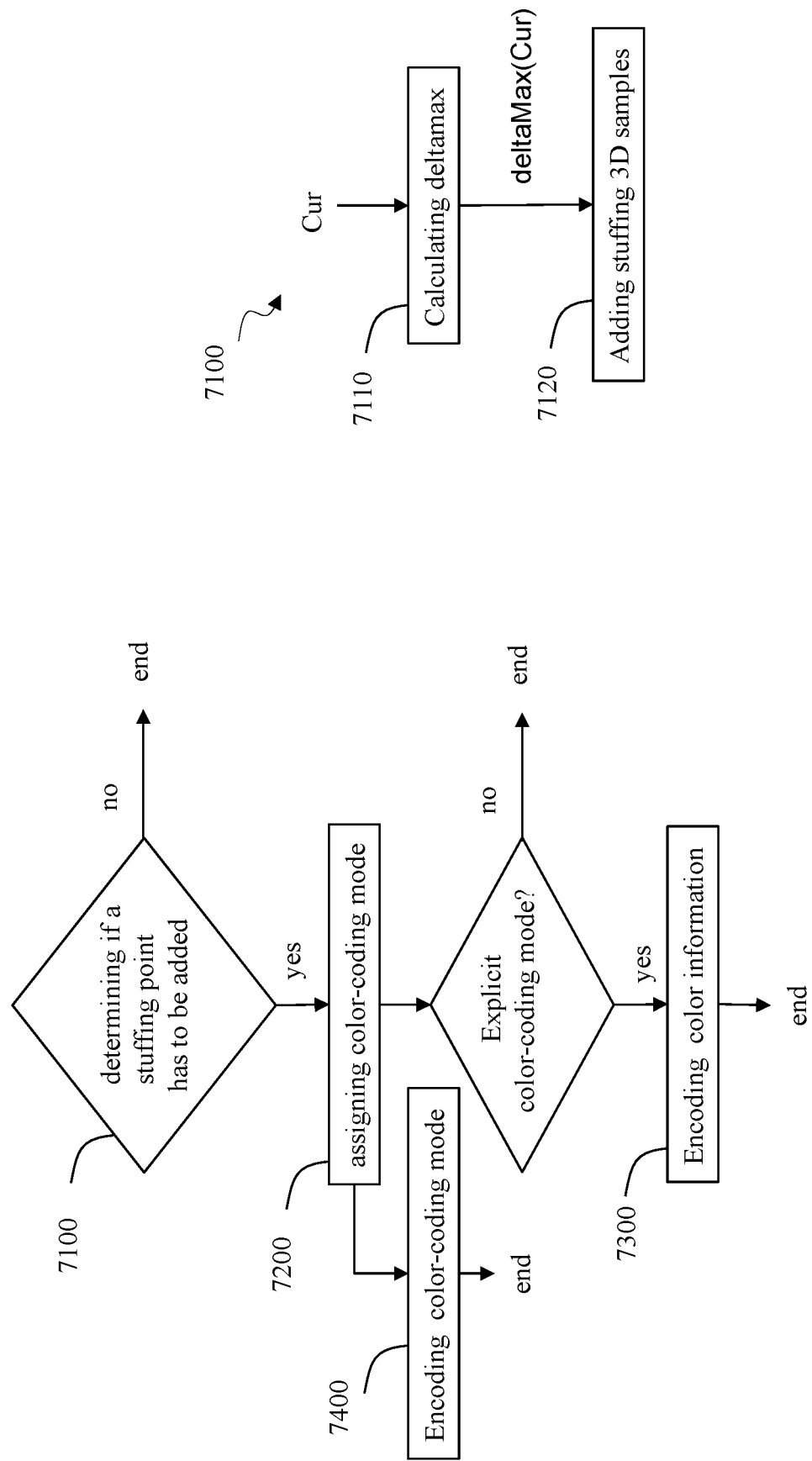

PROCESSING A POINT CLOUD

CROSS REFERENCE TO RELATED APPLICATIONS

This application is the national stage entry under 35 U.S.C. § 371 of International Application PCT/IB2018/050492, filed Jan. 21, 2019, which was published in accordance with PCT Article 21(2) on Jul. 25, 2019, in English, and which claims the benefit of European Patent Application No. EP18305048.3, filed Jan. 19, 2018; European Patent Application No. EP18305420.4, filed Apr. 10, 2018; and European Patent Application No. EP18305928.6, filed Jul. 11, 2018.

TECHNICAL FIELD

At least one of the present embodiments relates generally to a processing of a point cloud.

BACKGROUND

The present section is intended to introduce the reader to various aspects of art, which may be related to various aspects of at least one of the present embodiments that is described and/or claimed below. This discussion is believed to be helpful in providing the reader with background information to facilitate a better understanding of the various aspects of at least one embodiment.

Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

The automotive industry and the autonomous car are also domains in which point clouds may be used. Autonomous cars should be able to "probe" their environment to make good driving decisions based on the reality of their immediate neighbors. Typical sensors like LIDARs (Light Detection And Ranging) produce dynamic point clouds that are used by a decision engine. These point clouds are not intended to be viewed by a human being and they are typically small, not necessarily colored, and dynamic with a high frequency of capture. These point clouds may have other attributes like the reflectance provided by the LIDAR as this attribute provides good information on the material of the sensed object and may help in making decisions.

Virtual Reality and immersive worlds have become hot topics recently and are foreseen by many as the future of 2D flat video. The basic idea is to immerse the viewer in an environment that surrounds the viewer, in contrast to a standard TV in which the viewer can only look at the virtual world in front of the viewer. There are several gradations in the immersivity depending on the freedom of the viewer in the environment. A point cloud is a good format candidate for distributing Virtual Reality (VR) worlds.

It is important in many applications to be able to distribute dynamic point clouds to an end-user (or store them in a server) by consuming only a reasonable amount of bit-rate (or storage space for storage applications) while maintaining an acceptable (or preferably very good) quality of experience. Efficient compression of these dynamic point clouds is a key point in order to make the distribution chain of many immersive worlds practical.

At least one embodiment has been devised with the foregoing in mind.

SUMMARY

The following presents a simplified summary of at least one of the present embodiments in order to provide a basic understanding of some aspects of the present disclosure. This summary is not an extensive overview of an embodiment. It is not intended to identify key or critical elements of an embodiment. The following summary merely presents some aspects of at least one of the present embodiments in a simplified form as a prelude to the more detailed description provided elsewhere in the document.

According to a general aspect of at least one embodiment, there is provided a method that adds at least one 3D sample to a point cloud, and assigning a color-coding mode to said at least one 3D sample, said color-coding mode indicating if color information associated with said at least one 3D sample is explicitly encoded in a bitstream or if said color information is implicit.

One or more of at least one of the present embodiment also provide a device, a computer program, a computer readable storage medium and a signal.

The specific nature of at least one of the present embodiments as well as other objects, advantages, features and uses of said at least one of the present embodiments will become evident from the following description of examples taken in conjunction with the accompanying drawings.

BRIEF DESCRIPTION OF DRAWINGS

In the drawings, examples of several embodiments are illustrated. The drawings show:

FIG. 7 illustrates a schematic block diagram of an example of a method for adding at least one stuffing 3D sample to a point cloud frame PCF in accordance with at least one of the present embodiments;

FIG. 7a illustrates a schematic block diagram of an example of an embodiment of the method of FIG. 7;

DETAILED DESCRIPTION

Figure 1:
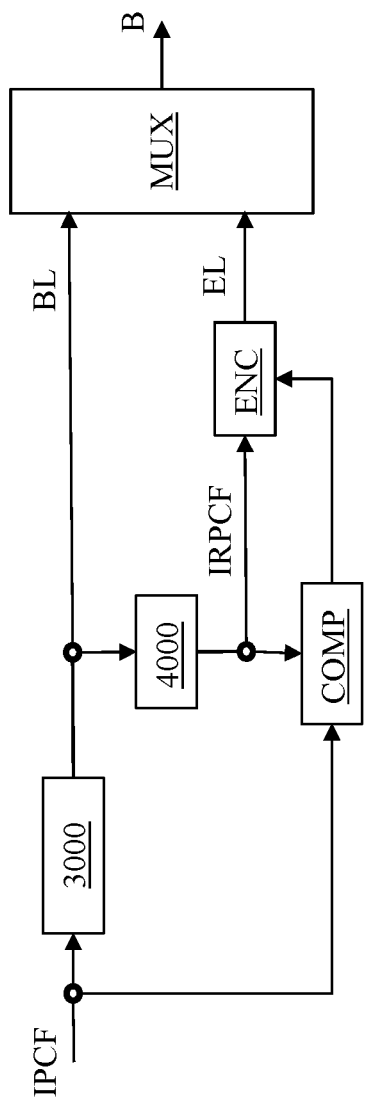
FIG. 1 illustrates a schematic block diagram of an example of a two-layer-based point cloud encoding structure in accordance with at least one of the present embodiments.

At least one of the present embodiments is described more fully hereinafter with reference to the accompanying figures, in which examples of at least one of the present embodiments are shown. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of this application.

When a figure is presented as a flow diagram, it should be understood that it also provides a block diagram of a corresponding apparatus. Similarly, when a figure is presented as a block diagram, it should be understood that it also provides a flow diagram of a corresponding method/process. Similar or same elements are referenced with the same reference numbers.

The aspects described and contemplated below may be implemented in many different forms. FIGS. 1-12 below provide some embodiments, but other embodiments are contemplated and the discussion of FIGS. 1-12 does not limit the breadth of the implementations.

At least one of the aspects generally relates to point cloud encoding and decoding, and at least one other aspect generally relates to transmitting a bitstream generated or encoded.

More precisely, various methods and other aspects described herein may be used to modify modules. They may be done just after reconstructing a geometry of a point cloud or after reconstructing geometry and assigning color information. A patch generating module PGM (step 3100 in FIG. 3), a texture image generator TIG (step 3400 in FIG. 3) and a geometry generating module GGM (step 4500 in FIG. 4) are example of potential modified modules.

For example, the patch generating module PGM (step 3100 in FIG. 3) adds at least one stuffing 3D samples and encoded (or not) explicitly a color information associated with said at least one stuffing 3D sample. The texture image generator TIG (step 3400 in FIG. 3) or the geometry generating module GGM (step 4500 in FIG. 4) may assign interpolated color information or decoded color information to stuffing 3D samples.

Moreover, the present aspects are not limited to MPEG standards such as MPEG-I part 5 that relates to the Point Cloud Compression, and may be applied, for example, to other standards and recommendations, whether pre-existing or future-developed, and extensions of any such standards and recommendations (including MPEG-I part 5). Unless indicated otherwise, or technically precluded, the aspects described in this application may be used individually or in combination.

In the following, image data refer to data, for example, one or several arrays of 2D samples in a specific image/video format. A specific image/video format may specify information pertaining to pixel values of an image (or a video). A specific image/video format may also specify information which may be used by a display and/or any other apparatus to visualize and/or decode an image (or video) for example. An image typically includes a first component, in the shape of a first array of 2D samples, usually representative of luminance (or luma) of the image. An image may also include a second component and a third component, in the shape of other arrays of 2D samples, usually representative of the chrominance (or chroma) of the image. Some embodiments represent the same information using a set of 2D arrays of color samples, such as the traditional tri-chromatic RGB representation.

A pixel value is represented in one or more embodiments by a vector of C values, where C is the number of components. Each value of a vector is typically represented with a number of bits which may define a dynamic range of the pixel values.

An image block means a set of pixels which belong to an image. The pixel values of an image block (or image block data) refer to the values of the pixels which belong to this image block. An image block may have an arbitrary shape, although rectangles are common.

A point cloud may be represented by a dataset of 3D samples within a 3D volumetric space that have unique coordinates and that may also have one or more attributes.

A 3D sample of this data set may be defined by its spatial location (X, Y, and Z coordinates in a 3D space) and possibly by one or more associated attributes such as a color, represented in the RGB or YUV color space for example, a transparency, a reflectance, a two-component normal vector or any feature representing a feature of this sample. For example, a 3D sample may be defined by 6 components (X, Y, Z, R, G, B) or equivalently (X, Y, Z, y, U, V) where (X,Y,Z) defines the coordinates of a point in a 3D space and (R,G,B) or (y,U,V) defines a color of this 3D sample. The same type of attribute may be present multiple times. For example, multiple color attributes may provide color information from different points of view.

A point cloud may be static or dynamic depending on whether or not the cloud changes with respect to time. A static point cloud or an instance of a dynamic point cloud is usually denoted as a point cloud frame. It should be noticed that in the case of a dynamic point cloud, the number of 3D samples is generally not constant but, on the contrary, generally changes with time. More generally, a point cloud may be considered as dynamic if anything changes with time, such as, for example, the number of points, the position of one or more points, or any attribute of any point.

As an example, a 2D sample may be defined by 6 components (u, v, Z, R, G, B) or equivalently (u, v, Z, y, U, V). (u,v) defines the coordinates of a 2D sample in a 2D space of the projection plane. Z is the depth value of a projected 3D sample onto this projection plane. (R,G,B) or (y,U,V) defines a color of this 3D sample.

FIG. 1 illustrates a schematic block diagram of an example of a two-layer-based point cloud encoding structure 1000 in accordance with at least one of the present embodiments.

The two-layer-based point cloud encoding structure 1000 may provide a bitstream B representative of a input point cloud frame IPCF. Possibly, said input point cloud frame IPCF represent a frame of a dynamic point cloud. Then, a frame of said dynamic point cloud may be encoded by the two-layer-based point cloud encoding structure 1000 independently from another frame.

Basically, the two-layer-based point cloud encoding structure 1000 may provide ability to structure the bitstream B as a Base Layer BL and an Enhancement Layer EL. The base layer BL may provide a lossy representation of an input point cloud frame IPCF and the enhancement layer EL may provide a lossless representation by encoding isolated points not represented by the base layer BL. As a possible alternative, the enhancement layer EL may provide a higher quality (but lossy) representation of an input point cloud frame IPCF by encoding additional points, not represented by the base layer BL.

Figure 3:
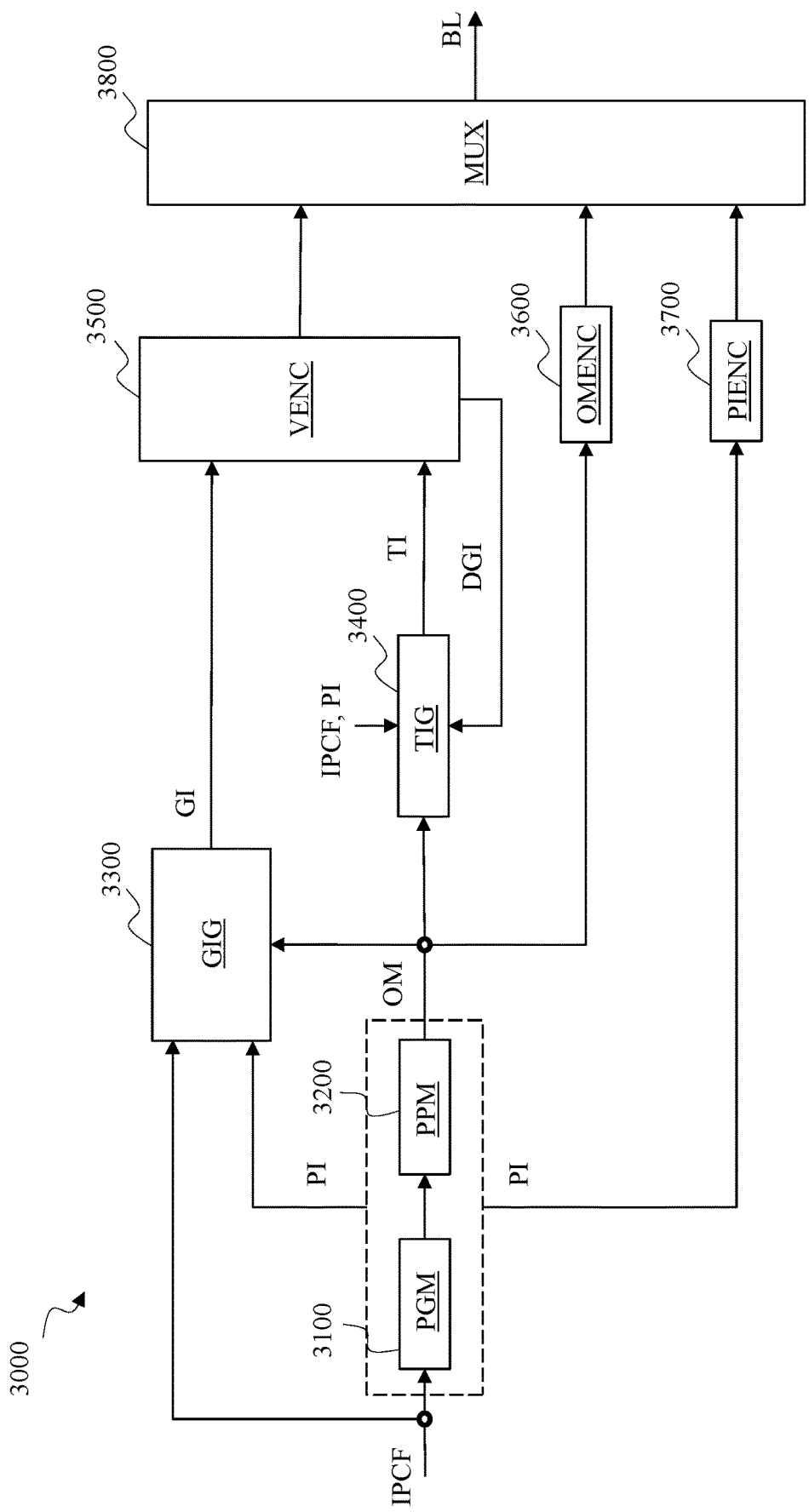
FIG. 3 illustrates a schematic block diagram of an example of an image-based point cloud encoder in accordance with at least one of the present embodiments.
Figure 4:
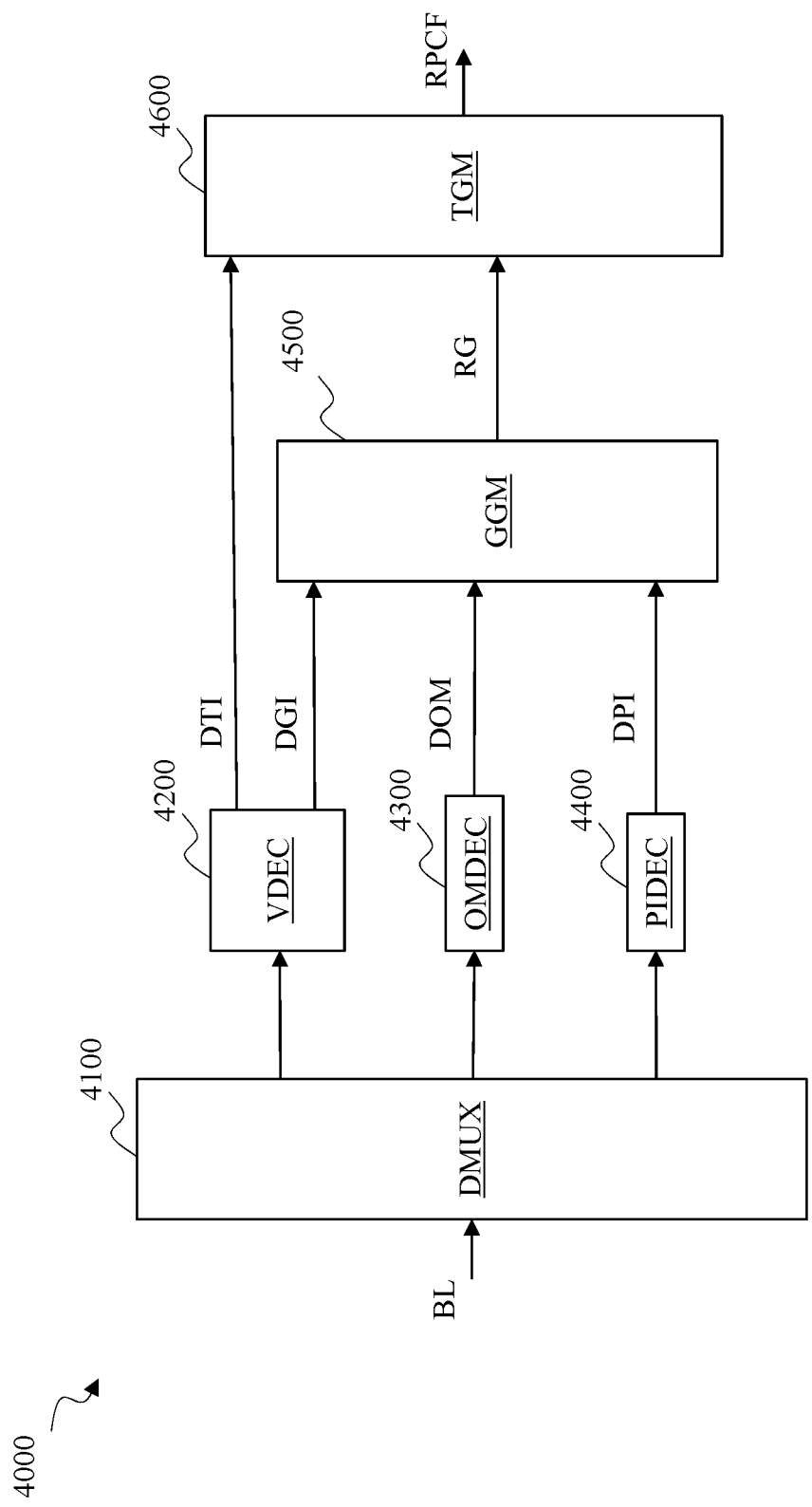
FIG. 4 illustrates a schematic block diagram of an example of an image-based point cloud decoder 4000 in accordance with at least one of the present embodiments.

The base layer BL may be provided by an image-based encoder 3000 as illustrated in FIG. 3 that may provide geometry/texture images representing the geometry/attributes of 3D samples of the input point cloud frame IPCF, and that may allow isolated 3D samples to be discarded. The base layer BL may be decoded by an image-based decoder 4000 as illustrated in FIG. 4 that may provide an intermediate reconstructed point cloud frame IRPCF.

Then, back to the two-layer-based point cloud encoding 1000 in FIG. 1, a comparator COMP may compare the 3D samples of the input point cloud frame IPCF to the 3D samples of the intermediate reconstructed point cloud frame IRPCF in order to detect/locate missed/isolated 3D samples. Next, an encoder ENC may encode the missed 3D samples and may provide the enhancement layer EL. Finally, the base layer BL and the enhancement layer EL may be multiplexed together by a multiplexer MUX so as to generate the bitstream B.

According to an embodiment, the encoder ENC may comprise a detector that may detect and associate a 3D reference sample R of the intermediate reconstructed point cloud frame IRPCF to a missed 3D samples M. The encoder ENC may also be an image-based encoder.

For example, a 3D reference sample R associated with a missed 3D sample M may be its nearest neighbor of M according to a given metric.

According to an embodiment, the encoder ENC may then encode the spatial locations of the missed 3D samples M and their attributes as differences determined according to spatial locations and attributes of said 3D reference samples R.

In a variant, those differences may be encoded separately.

For example, for a missed 3D sample M, with spatial coordinates x(M), y(M) and z(M), a x-coordinate difference Dx(M), a y-coordinate position difference Dy(M), a z-difference Dz(M), a R-attribute component difference Dr(M), a G-attribute component difference Dg(M) and the B-attribute component difference Db(M) may be calculated as follows:

$$Dx(M)=x(M)-x(R),$$

where x(M) is the x-coordinate of the 3D sample M, respectively R in a geometry image provided by FIG. 3, $$Dy(M)=y(M)-y(R)$$

where y(M) is the y-coordinate of the 3D sample M, respectively R in a geometry image provided by FIG. 3, $$Dz(M)=z(M)-z(R)$$

where z(M) is the z-coordinate of the 3D sample M, respectively R in a geometry image provided by FIG. 3, $$Dr(M)=R(M)-R(R).$$

where R(M), respectively R(R) is the r-color component of a color attribute of the 3D sample M, respectively R, $$Dg(M)=G(M)-G(R).$$

where G(M), respectively G(R) is the g-color component of a color attribute of the 3D sample M, respectively R, $$Db(M)=B(M)-B(R).$$

where B(M), respectively B(R) is the b-color component of a color attribute of the 3D sample M, respectively R.

Figure 2:
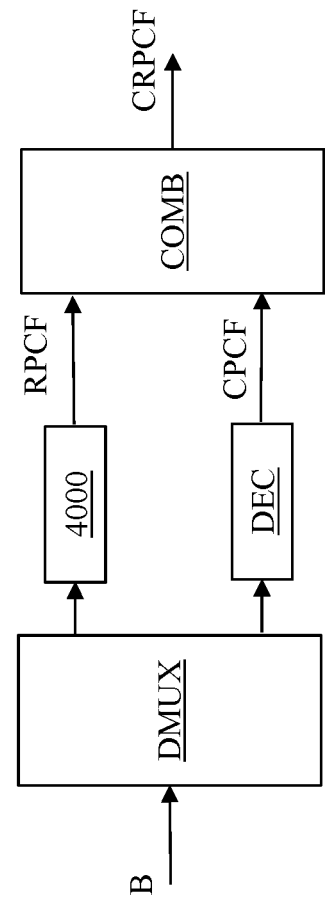
FIG. 2 illustrates a schematic block diagram of an example of a two-layer-based point cloud decoding structure in accordance with at least one of the present embodiments.

FIG. 2 illustrates a schematic block diagram of an example of a two-layer-based point cloud decoding structure 2000 in accordance with at least one of the present embodiments.

The behavior of the two-layer-based point cloud decoding structure 2000 depends on its capabilities.

A two-layer-based point cloud decoding structure 2000 with limited capabilities may access only the base layer BL from the bitstream B by using a de-multiplexer DMUX, and then may provide a faithful (but lossy) version RPCF of the input point cloud frame IPCF by decoding the base layer BL by a point cloud decoder 4000 as illustrated in FIG. 4.

A two-layer-based point cloud decoding structure 2000 with full capabilities may access both the base layer BL and the enhancement layer EL from the bitstream B by using the de-multiplexer DMUX. The point cloud decoder 4000, as illustrated in FIG. 4, may determine the reconstructed point cloud frame RPCF from the base layer BL. The decoder DEC may determine a complementary point cloud frame CPCF from the enhancement layer EL. A combiner COM then may combine together the reconstructed point cloud frame RPCF and the complementary point cloud frame CPCF to therefore provide a lossless (or higher quality) representation (reconstruction) CRPCF of the input point cloud frame IPCF.

FIG. 3 illustrates a schematic block diagram of an example of an image-based point cloud encoder 3000 in accordance with at least one of the present embodiments.

The image-based point cloud encoder 3000 leverages existing video codecs to compress the geometry and texture (attribute) information of a dynamic point cloud. This is accomplished by essentially converting the point cloud data into a set of different video sequences.

In particular embodiments, two videos, one for capturing the geometry information of the point cloud data and another for capturing the texture information, may be generated and compressed using existing video codecs.

An example of an existing video codec is the HEVC Main profile encoder/decoder (ITU-T H.265 Telecommunication standardization sector of ITU (February 2018), series H: audiovisual and multimedia systems, infrastructure of audiovisual services—coding of moving video, High efficiency video coding, Recommendation ITU-T H.265).

Additional metadata that are used to interpret the two videos are typically also generated and compressed separately. Such additional metadata includes, for example, an occupancy map OM and/or auxiliary patch information PI.

The generated video bitstreams and the metadata may be then multiplexed together so as to generate a combined bitstream.

It should be noted that the metadata typically represents a small amount of the overall information. The bulk of the information is in the video bitstreams.

An example of such a point cloud coding/decoding process is given by the Test model Category 2 algorithm (also denoted V-PCC) as defined in ISO/IEC JTC1/SC29/WG11 MPEG2018/N18030 and N17996 (October 2018, Macao).

In step 3100, a patch generating module PGM may generate at least one patch by decomposing 3D samples of a data set representative of the input point cloud frame IPCF to 2D samples on a given projection plane using a strategy that provides best compression.

A patch may be defined as a set of 2D samples.

For example, in V-PCC, a normal at every 3D sample is first estimated as described, for example, in Hoppe et al. (Hugues Hoppe, Tony DeRose, Tom Duchamp, John McDonald, Werner Stuetzle. Surface reconstruction from unorganized points. ACM SIGGRAPH 1992 Proceedings, 71-78). Next, an initial clustering of the input point cloud frame IPCF is obtained by associating each 3D sample with one of the six oriented planes of a 3D bounding box encompassing the 3D samples of the input point cloud frame IPCF. More precisely, each 3D sample is clustered and associated with an oriented plane that has the closest normal (that is maximizes the dot product of the point normal and the plane normal). Then the 3D samples are projected to their associated planes. A set of 3D samples that forms a connected area in their plane is referred as a connected component. A connected component is a set of at least one 3D samples having similar normal and a same associated oriented plane. The initial clustering is then refined by iteratively updating the cluster associated with each 3D sample based on its normal and the clusters of its nearest neighboring samples. The final step consists of generating one patch from each connected component, that is done by projecting the 3D samples of each connected component onto the oriented plane associated with said connected component.

Figure 3A:
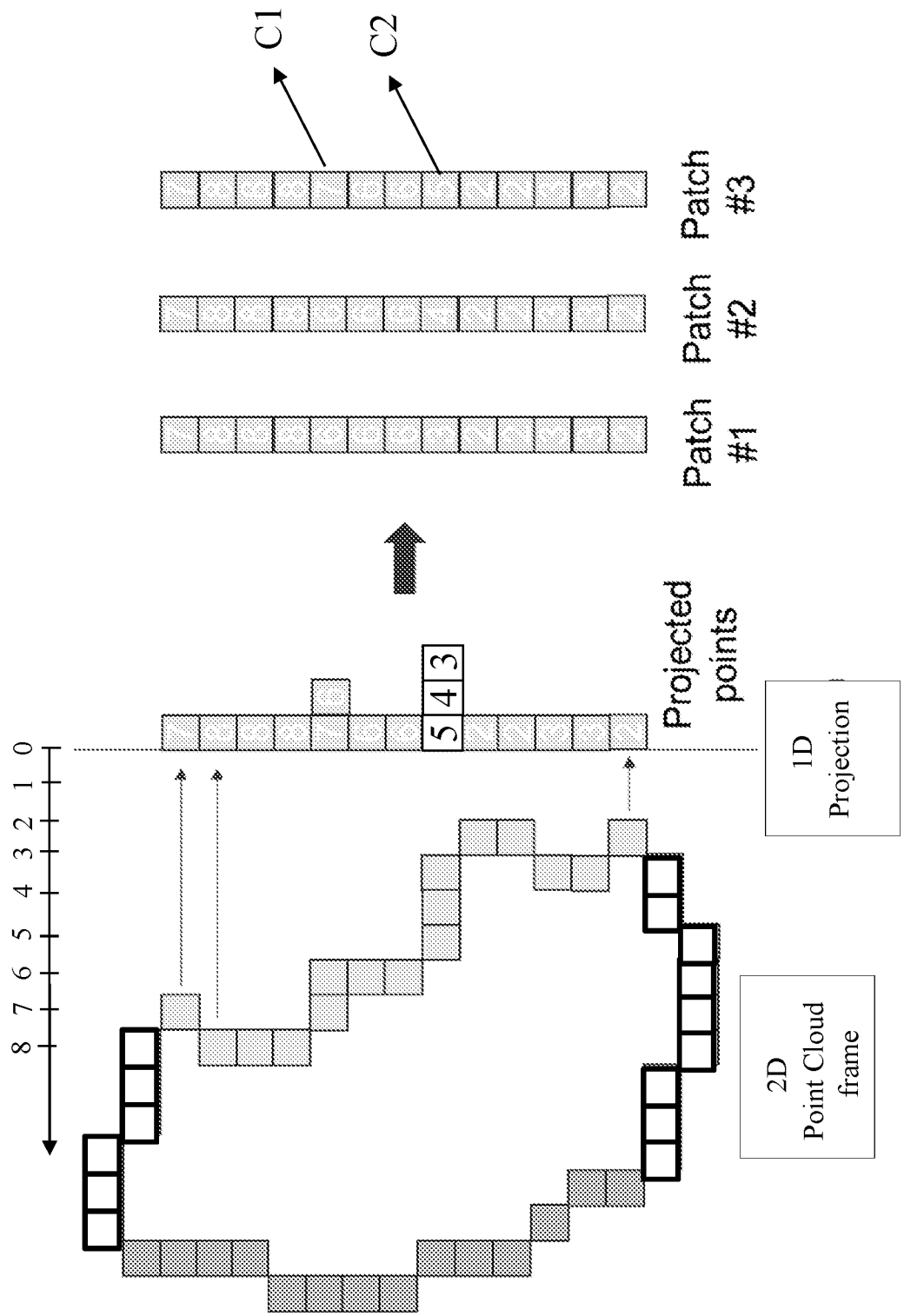
FIG. 3a illustrates schematically an example patch generation according to step 3100.

FIG. 3*a* illustrates schematically an example of a patch generation according to an embodiment of step 3100 where a point cloud frame (here a 2D point cloud frame) has been segmented into four connected components: a first connected component comprising light grey rectangles (samples), a second one comprising dark grey rectangles, a third one comprising hatched rectangles and a fourth one comprising dotted rectangles. As shown, the first connected component is projected onto a vertical "line" (in the shown example, 2D samples (and not 3D samples) are projected along a line (and not a plane)) resulting in some spatial positions in the projection line having more than one depth value, up to three in this example. Then, three patches #1, #2 and #3 are generated to capture all the projected information (depth) relative to the first connected component.

A patch is associated with auxiliary patch information PI that represents auxiliary patch information defined for each patch to interpret the projected 2D samples that correspond to the geometry and/or attribute information.

In V-PCC, for example, the auxiliary patch information PI includes 1) information indicating one of the six oriented planes of a 3D bounding box encompassing the 3D samples of a connected component; 2) information relative to the plane normal; 3) information determining the 3D location of a connected component relative to a patch represented in terms of depth, tangential shift and bi-tangential shift; and 4) information such as coordinates (u0, v0, u1, v1) in a projection plane defining a 2D bounding box encompassing a patch.

In step 3200, a patch packing module PPM may map (place) at least one generated patch onto a 2D grid (also called canvas) without any overlapping in a manner that minimize the unused space, and may guarantee that every T×T (for example, 16×16) block of the 2D grid is associated with a unique patch. A given minimum block size T×T of the 2D grid may specify the minimum distance between distinct patches as placed on this 2D grid. The 2D grid resolution may depend on the input point cloud size and its width W and height H and the block size T may be transmitted as metadata to the decoder.

The auxiliary patch information PI may further include information relative to an association between a block of the 2D grid and a patch.

In V-PCC, the auxiliary information PI include a block to patch index information that determines an association between a block of the 2D grid and a patch index.

T×T blocks containing 2D samples belonging to a patch may be considered as occupied blocks in the corresponding occupancy map OM. A block of the occupancy map OM may then indicate whether a block is occupied, that is contains 2D samples that belong to a patch.

The image generation processes (steps 3300 and 3400) exploit the mapping of the at least one generated patch onto the 2D grid computed during step 3200, to store the geometry and texture of the input point cloud frame IPCF as images.

In step 3300, a geometry image generator GIG may generate at least one geometry image GI from the input point cloud frame IPCF, the occupancy map OM and the auxiliary patch information PI. The geometry image generator GIG may exploit the occupancy map information in order to detect (locate) the occupied blocks and thus the non-empty pixels in the geometry image GI.

A geometry image GI may represent the geometry of the input point cloud frame IPCF and may be a monochromatic image of W×H pixels represented, for example, in YUV420-8 bit format.

In order to better handle the case of multiple 3D samples being projected (mapped) to a same 2D sample of the projection plane (along a same projection direction (line)), multiple images, referred to as layers, may be generated. Thus, a 2D sample of a patch may have different depth values $D1, \ldots, Dn$ associated with and multiple geometry images are generated.

In V-PCC, 2D samples of a patch are projected onto two layers. A first layer, also called the near layer, may store, for example, the depth values D0 associated with the 2D samples with the lowest depth. A second layer, referred to as the far layer, may store, for example, the difference between the depth values D1 associated with the 2D samples with the highest depth and D0. The information stored by the second depth image is thus within the interval $[0, \Delta]$ corresponding to depth values in the range $[D0, D0+\Delta]$, where $\Delta$ is a user-defined parameter that describes the surface thickness.

By this way, the second layer may contain significant contour-like high frequency features. Thus, it clearly appears that the second depth image is very hard to be coded by using a legacy video coder and, therefore, the depth values are poorly reconstructed from said decoded second depth image, which results on a poor quality of the geometry of the reconstructed point cloud frame.

According to an embodiment, the geometry image generating module GIG may code (derive) depth values associated with 2D samples of the first and second layers by using the auxiliary patch information PI.

In V-PCC, the location of a 3D sample in a patch with a corresponding connected component may be expressed in terms of depth δ(u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v$$

where g(u, v) is the luma component of the geometry image, (u,v) is a pixel associated with the 3D sample on a projection plane, (δ0, s0, r0) is the 3D location of the corresponding patch of a connected component to which the 3D sample belongs and (u0, v0, u1, v1) are the coordinates in said projection plane defining a 2D bounding box encompassing the projection of the patch associate with said connected component.

Thus, a geometry image generating module GIG may code (derive) depth values associated with 2D samples of a layer (first or second or both) as a luma component g(u,v) given by: g(u,v)=δ(u, v)−δ0. It is noted that this relationship may be employed to reconstruct 3D sample locations (δ0, s0, r0) from a reconstructed geometry image g(u, v) with the accompanying auxiliary patch information PI.

According to an embodiment, a projection mode may be used to indicate if the first geometry image GI0 may store the depth values of the 2D samples of either the first or second layer and the second geometry image GI1 may store the depth values associated with the 2D samples of either the second or first layer.

For example, when a projection mode equals 0, then the first geometry image GI0 may store the depth values of 2D samples of the first layer and the second geometry image GI1 may store the depth values associated with 2D samples of the second layer. Reciprocally, when a projection mode equals 1, then the first geometry image GI0 may store the depth values of 2D samples of the second and the second geometry image GI1 may store the depth values associated with 2D samples of the first layer.

According to an embodiment, a frame projection mode may be used to indicate if a fixed projection mode is used for all the patches or if a variable projection mode where each patch may use a different projection mode.

The projection mode and/or the frame projection mode may be transmitted as metadata.

A frame projection mode decision algorithm may be provided, for example, in section 2.2.1.3.1 of V-PCC.

According to an embodiment, when the frame projection indicates that a variable projection mode may be used, a patch projection mode may be used to indicate the appropriate mode to use to (de-)project a patch.

A patch projection mode may be transmitted as metadata and may be, possibly, an information included in the auxiliary patch information PI.

A patch projection mode decision algorithm is provided as example in section 2.2.1.3.2 of V-PCC.

The use of several geometry layers may still fail to properly capture the geometry of a point cloud frame if a given number of layers is not sufficient. But, increasing the number of layers increases the overall bitrate, reducing thus the compression efficiency.

In step 3400, a texture image generator TIG may generate at least one texture image TI from the input point cloud frame IPCF, the occupancy map OM, the auxiliary patch information PI and a geometry of a reconstructed point cloud frame derived from at least one decoded geometry image DGI, output of a video decoder VDEC (step 4200 in FIG. 4).

A texture image TI may represent the texture of the input point cloud frame IPCF and may be an image of W×H pixels represented, for example, in YUV420-8 bit format.

The texture image generator TG may exploit the occupancy map information in order to detect (locate) the occupied blocks and thus the non-empty pixels in the texture image.

The texture image generator TIG may be adapted to generate and associate a texture image TI with each geometry image/layer DGI.

According to an embodiment, the texture image generator TIG may code (store) the texture (attribute) values T0 associated with 2D samples of the first layer as pixel values of a first texture image TI0 and the texture values T1 associated with the 2D samples of the second layer as pixel values of a second texture image TI1.

Alternatively, the texture image generating module TIG may code (store) the texture values T1 associated with 2D samples of the second layer as pixel values of the first texture image TI0 and the texture values D0 associated with the 2D samples of the first layer as pixel values of the second geometry image GI1.

For example, colors of 3D samples may be obtained as described in section 2.2.3, 2.2.4, 2.2.5, 2.2.8 or 2.5 of V-PCC.

According to an embodiment, a padding process may be applied on the geometry and/or texture image. The aims being at filling empty space between patches to generate piecewise smooth image suited for video compression.

An image padding example is provided in sections 2.2.6 and 2.2.7 of V-PCC.

In step 3500, a video encoder VENC may encode the generated images/layers TI and GI.

In step 3600, an encoder OMENC may encode the occupancy map as an image as detailed, for example, in section 2.2.2 of V-PCC. Lossy or lossless encoding may be used.

According to an embodiment, the video encoder ENC and/or OMENC may be an HEVC-based encoder.

In step 3700, an encoder PIENC may encode the auxiliary patch information PI and possibly additional metadata such as the block size T, the width W and height H of the geometry/texture images.

According to an embodiment, the auxiliary patch information may be differentially encoded (as defined, for example in section 2.4.1 of V-PCC).

In step 3800, a multiplexer the generated video bit-streams, output of step 3500, 3600 and 3700, may be multiplexed together so as to generate a bitstream representative of the base layer BL. It should be noted that the metadata information represents a small fraction of the overall bitstream. The bulk of the information is compressed using the video codecs.

FIG. 4 illustrates a schematic block diagram of an example of an image-based point cloud decoder 4000 in accordance with at least one of the present embodiments.

In step 4100, a de-multiplexer DMUX may access to encoded information of the bitstream representative of the base layer BL.

In step 4200, a video decoder VDEC may decode encoded information to derive at least one decoded geometry image DGI and at least one decoded texture image DTI.

In step 4300, a decoder OMDEC may decode encoded information to derive a decoded occupancy map DOM.

According to an embodiment, the video decoder VDEC and/or OMDEC may be a HEVC-based decoder.

In step 4400, a decoder PIDEC may decode encoded information to derive auxiliary patch information DPI.

Possibly, metadata may also be derived from the bitstream BL.

In step 4500, a geometry generating module GGM may derive the geometry RG of a reconstructed point cloud frame RPCF (or IRPCF) from the at least one decoded geometry image DGI, the decoded occupancy map DOM, the decoded auxiliary patch information DPI and possible additional metadata.

The geometry generating module GGM may exploit the decoded occupancy map information DOM in order to locate the non-empty pixels in the at least one decoded geometry image DGI. The 3D coordinates of reconstructed 3D samples associated with non-empty pixels may then be derived from the coordinates of said non-empty pixels and the values of said reconstructed 2D samples.

According to an embodiment, the geometry generating module GGM may derive the 3D coordinates of reconstructed 3D samples from coordinates of non-empty pixels.

According to an embodiment, the geometry generating module GGM may derive the 3D coordinates of reconstructed 3D samples from coordinates of non-empty pixels, values of said non-empty pixels of one of the at least one decoded geometry image DGI, the decoded auxiliary patch information, and possibly, from additional metadata.

The use of non-empty pixels is based on 2D pixel relationship with 3D samples. For example, with the said projection in V-PCC, the 3D coordinates of reconstructed 3D samples may be expressed in terms of depth $\delta(u, v)$, tangential shift $s(u, v)$ and bi-tangential shift $r(u, v)$ as follows:

$$\delta(u,v) = \delta 0 + g(u,v)$$

$$s(u,v) = s0 - u0 + u$$

$$r(u,v) = r0 - v0 + v$$

where g(u, v) is the luma component of a decoded geometry image DGI, (u,v) is a pixel associated with a reconstructed 3D sample, ($\delta$0, s0, r0) is the 3D location of a connected component to which the reconstructed 3D sample belongs and (u0, v0, u1, v1) are the coordinates in a projection plane defining a 2D bounding box encompassing the projection of a patch associate with said connected component.

In step 4600, a texture generating module TGM may derive the texture of the reconstructed point cloud frame RPCF (or IRPCF) from the geometry RG and the at least one decoded texture image DTI.

Figure 5:
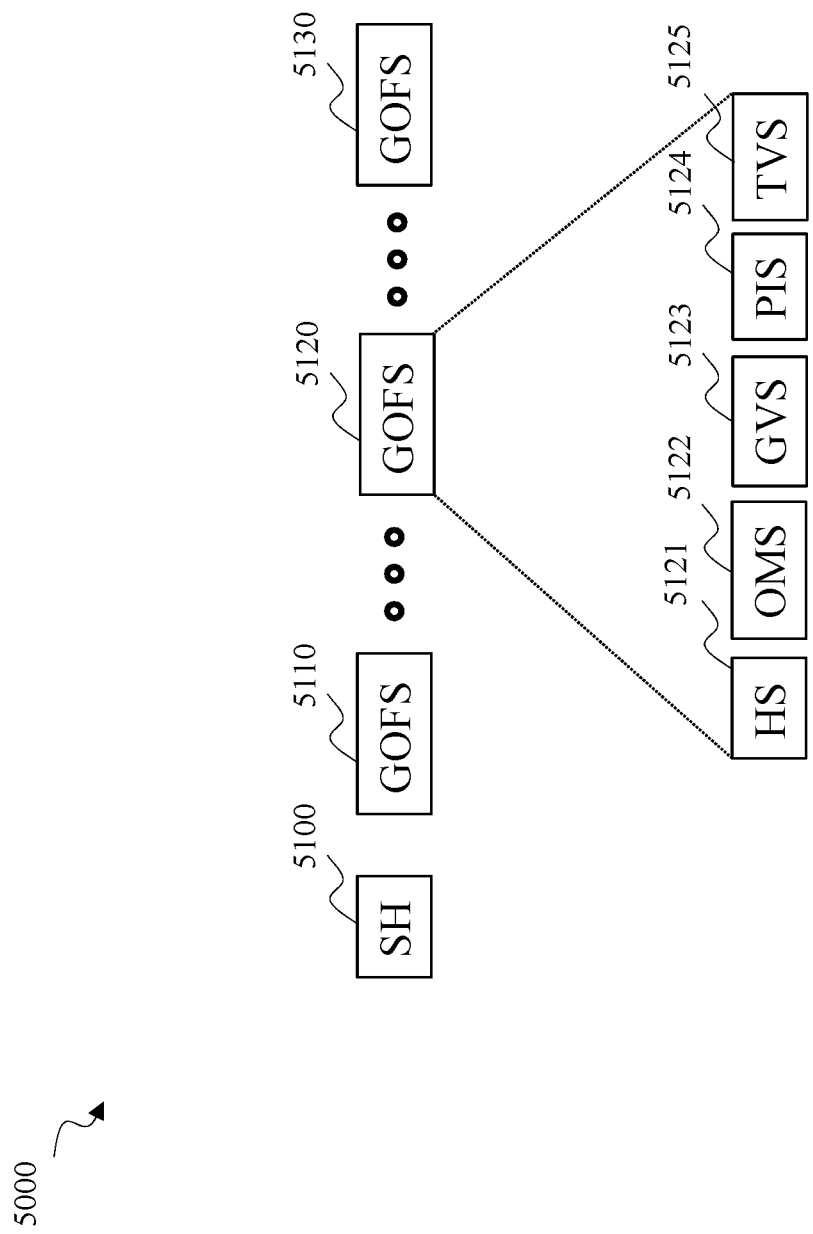
FIG. 5 illustrates schematically an example of syntax of a bitstream representative of a base layer BL in accordance with at least one of the present embodiments.

FIG. 5 illustrates schematically an example syntax of a bitstream representative of a base layer BL in accordance with at least one of the present embodiments.

The bitstream comprises a Bitstream Header BSH and at least one Group Of Frame Stream GOFS.

A group of frame stream GOFS comprises a header HS, at least one syntax element OMS representative of an occupancy map OM, at least one syntax element GVS representative of at least one geometry image (or video), at least one syntax element TVS representative of at least one texture image (or video) and at least one syntax element PIS representative of auxiliary patch information and other additional metadata.

In a variant, a group of frame stream GOFS comprises at least one frame stream.

Figure 6:
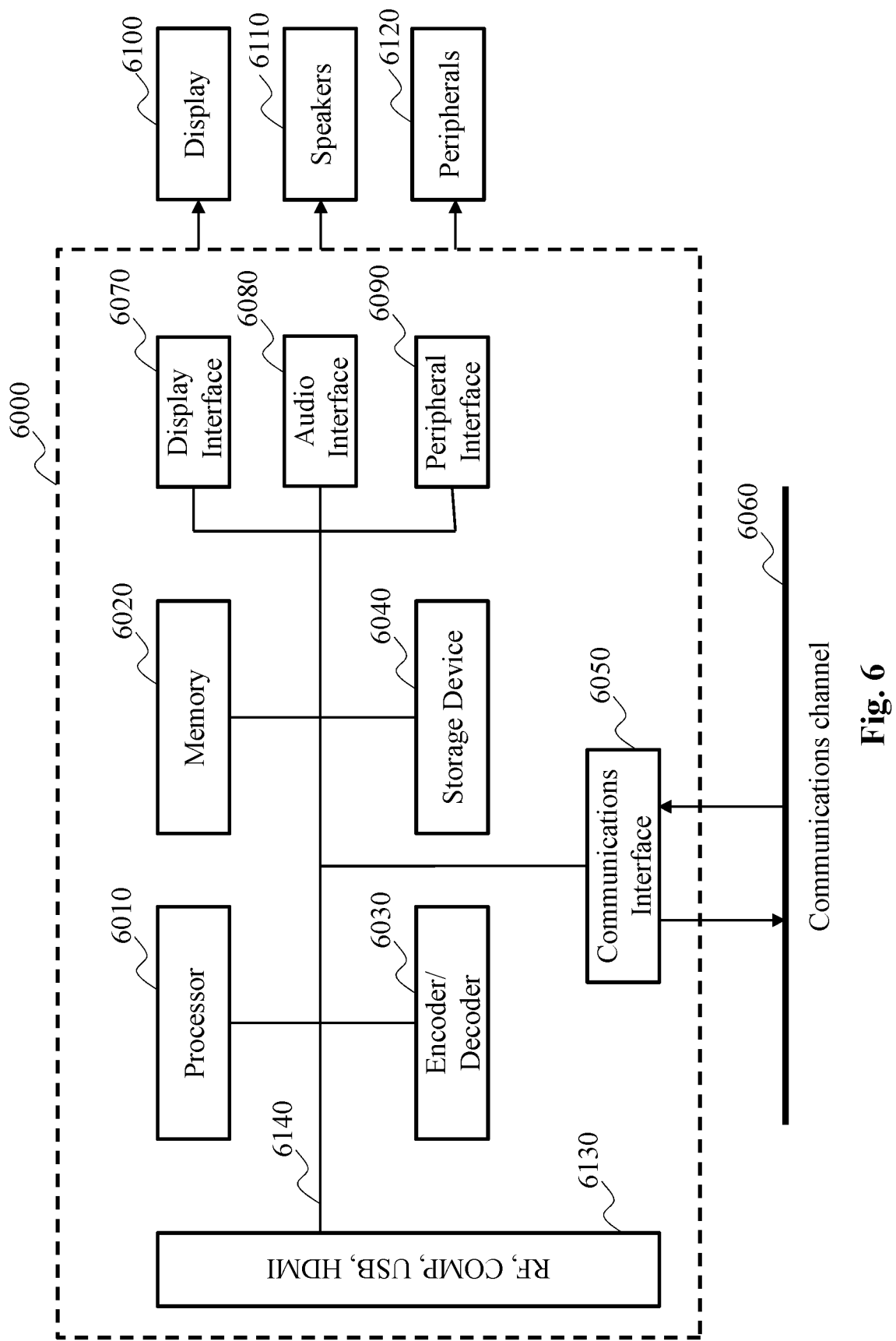
FIG. 6 illustrates a schematic block diagram of an example of a system in which various aspects and embodiments are implemented.

FIG. 6 shows a schematic block diagram illustrating an example of a system in which various aspects and embodiments are implemented.

System 6000 may be embodied as one or more devices including the various components described below and is configured to perform one or more of the aspects described in this document. Examples of equipment that may form all or part of the system 6000 include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 6000, singly or in combination, may be embodied in a single integrated circuit, multiple ICs, and/or discrete components. For example, in at least one embodiment, the processing and encoder/decoder elements of system 6000 may be distributed across multiple ICs and/or discrete components. In various embodiments, the system 6000 may be communicatively coupled to other similar systems, or to other electronic devices, via, for example, a communications bus or through dedicated input and/or output ports. In various embodiments, the system 6000 may be configured to implement one or more of the aspects described in this document.

The system 6000 may include at least one processor 6010 configured to execute instructions loaded therein for implementing, for example, the various aspects described in this document. Processor 6010 may include embedded memory, input output interface, and various other circuitries as known in the art. The system 6000 may include at least one memory 6020 (for example a volatile memory device and/or a non-volatile memory device). System 6000 may include a storage device 6040, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 6040 may include an internal storage device, an attached storage device, and/or a network accessible storage device, as non-limiting examples.

The system 6000 may include an encoder/decoder module 6030 configured, for example, to process data to provide encoded data or decoded data, and the encoder/decoder module 6030 may include its own processor and memory. The encoder/decoder module 6030 may represent module(s) that may be included in a device to perform the encoding and/or decoding functions. As is known, a device may include one or both of the encoding and decoding modules. Additionally, encoder/decoder module 6030 may be implemented as a separate element of system 6000 or may be incorporated within processor 6010 as a combination of hardware and software as known to those skilled in the art.

Program code to be loaded onto processor 6010 or encoder/decoder 6030 to perform the various aspects described in this document may be stored in storage device 6040 and subsequently loaded onto memory 6020 for execution by processor 6010. In accordance with various embodiments, one or more of processor 6010, memory 6020, storage device 6040, and encoder/decoder module 6030 may store one or more of various items during the performance of the processes described in this document. Such stored items may include, but are not limited to, a point cloud frame, encoded/decoded geometry/texture videos/images or portions of the encoded/decoded geometry/texture video/images, a bitstream, matrices, variables, and intermediate or final results from the processing of equations, formulas, operations, and operational logic.

In several embodiments, memory inside of the processor 6010 and/or the encoder/decoder module 6030 may be used to store instructions and to provide working memory for processing that may be performed during encoding or decoding.

In other embodiments, however, a memory external to the processing device (for example, the processing device may be either the processor 6010 or the encoder/decoder module 6030) may be used for one or more of these functions. The external memory may be the memory 6020 and/or the storage device 6040, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), or VVC (Versatile Video Coding).

The input to the elements of system 6000 may be provided through various input devices as indicated in block 6130. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 6130 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 6000 to other electronic devices across USB and/or HDMI connections. It is to be understood that various aspects of input processing, for example, Reed-Solomon error correction, may be implemented, for example, within a separate input processing IC or within processor 6010 as necessary. Similarly, aspects of USB or HDMI interface processing may be implemented within separate interface ICs or within processor 6010 as necessary. The demodulated, error corrected, and demultiplexed stream may be provided to various processing elements, including, for example, processor 6010, and encoder/decoder 6030 operating in combination with the memory and storage elements to process the data stream as necessary for presentation on an output device.

Various elements of system 6000 may be provided within an integrated housing. Within the integrated housing, the various elements may be interconnected and transmit data therebetween using suitable connection arrangement 6140, for example, an internal bus as known in the art, including the I2C bus, wiring, and printed circuit boards.

The system 6000 may include communication interface 6050 that enables communication with other devices via communication channel 6060. The communication interface 6050 may include, but is not limited to, a transceiver configured to transmit and to receive data over communication channel 3060. The communication interface 6050 may include, but is not limited to, a modem or network card and the communication channel 6060 may be implemented, for example, within a wired and/or a wireless medium.

Data may be streamed to the system 6000, in various embodiments, using a Wi-Fi network such as IEEE 802.11. The Wi-Fi signal of these embodiments may be received over the communications channel 6060 and the communications interface 6050 which are adapted for Wi-Fi communications. The communications channel 6060 of these embodiments may be typically connected to an access point or router that provides access to outside networks including the Internet for allowing streaming applications and other over-the-top communications.

Other embodiments may provide streamed data to the system 6000 using a set-top box that delivers the data over the HDMI connection of the input block 6130.

Still other embodiments may provide streamed data to the system 6000 using the RF connection of the input block 6130.

It is to be appreciated that signaling may be accomplished in a variety of ways. For example, one or more syntax elements, flags, and so forth may be used to signal information to a corresponding decoder in various embodiments.

The system 6000 may provide an output signal to various output devices, including a display 6100, speakers 6110, and other peripheral devices 6120. The other peripheral devices 6120 may include, in various examples of embodiments, one or more of a stand-alone DVR, a disk player, a stereo system, a lighting system, and other devices that provide a function based on the output of the system 3000.

In various embodiments, control signals may be communicated between the system 3000 and the display 6100, speakers 6110, or other peripheral devices 6120 using signaling such as AV.Link (Audio/Video Link), CEC (Consumer Electronics Control), or other communications protocols that enable device-to-device control with or without user intervention.

The output devices may be communicatively coupled to system 6000 via dedicated connections through respective interfaces 6070, 6080, and 6090.

Alternatively, the output devices may be connected to system 3000 using the communications channel 6060 via the communications interface 6050. The display 6100 and speakers 6110 may be integrated in a single unit with the other components of system 6000 in an electronic device such as, for example, a television.

In various embodiments, the display interface 6070 may include a display driver, such as, for example, a timing controller (T Con) chip.

The display 6100 and speaker 6110 may alternatively be separate from one or more of the other components, for example, if the RF portion of input 6130 is part of a separate set-top box. In various embodiments in which the display 6100 and speakers 6110 may be external components, the output signal may be provided via dedicated output connections, including, for example, HDMI ports, USB ports, or COMP outputs.

FIG. 7 illustrates a schematic block diagram of an example of a method for adding at least one 3D sample (denoted stuffing 3D sample) to a point cloud frame PCF in accordance with at least one of the present embodiments.

Said point cloud frame PCF is, for example, a reconstructed point cloud frame derived from at least one decoded geometry image DGI, that is, for example, the intermediate reconstructed point cloud IRPCF, the reconstructed point cloud frame RPCF or the reconstructed point cloud frame derived from the at least one decoded geometry images DGI of FIG. 3.

In step 7100, a module determines if at least one stuffing 3D sample has to be added to the point cloud frame PCF.

According to an embodiment of step 7100, at least one stuffing 3D sample may be added from a current 3D sample of the point cloud frame PCF according to a difference between the depth value of a neighboring 3D sample of said current 3D sample and the depth value of said current 3D sample.

If a stuffing 3D sample has to be added, in step 7200, a color-coding mode is assigned to said stuffing 3D sample. Said color-coding mode indicates if a color information associated with said 3D sample is explicitly encoded in a bitstream (explicit color-coding mode) or if a color information is implicit (implicit color-coding mode), that is if said color information is derived from color information associated with other 3D samples including 3D samples of the point cloud frame PCT and possibly other stuffing 3D samples.

Determining if a color information assigned to a stuffing 3D sample is explicitly encoded or not is a tradeoff between quality (when explicitly encoding) and bitrate reduction (when implicit).

In step 7300, a color information associated with a stuffing 3D sample is encoded in a bitstream if an explicit color-coding mode is associated with said stuffing 3D sample.

Optionally, in step 7400, the color-coding mode is encoded in a bitstream.

Figure 7B:
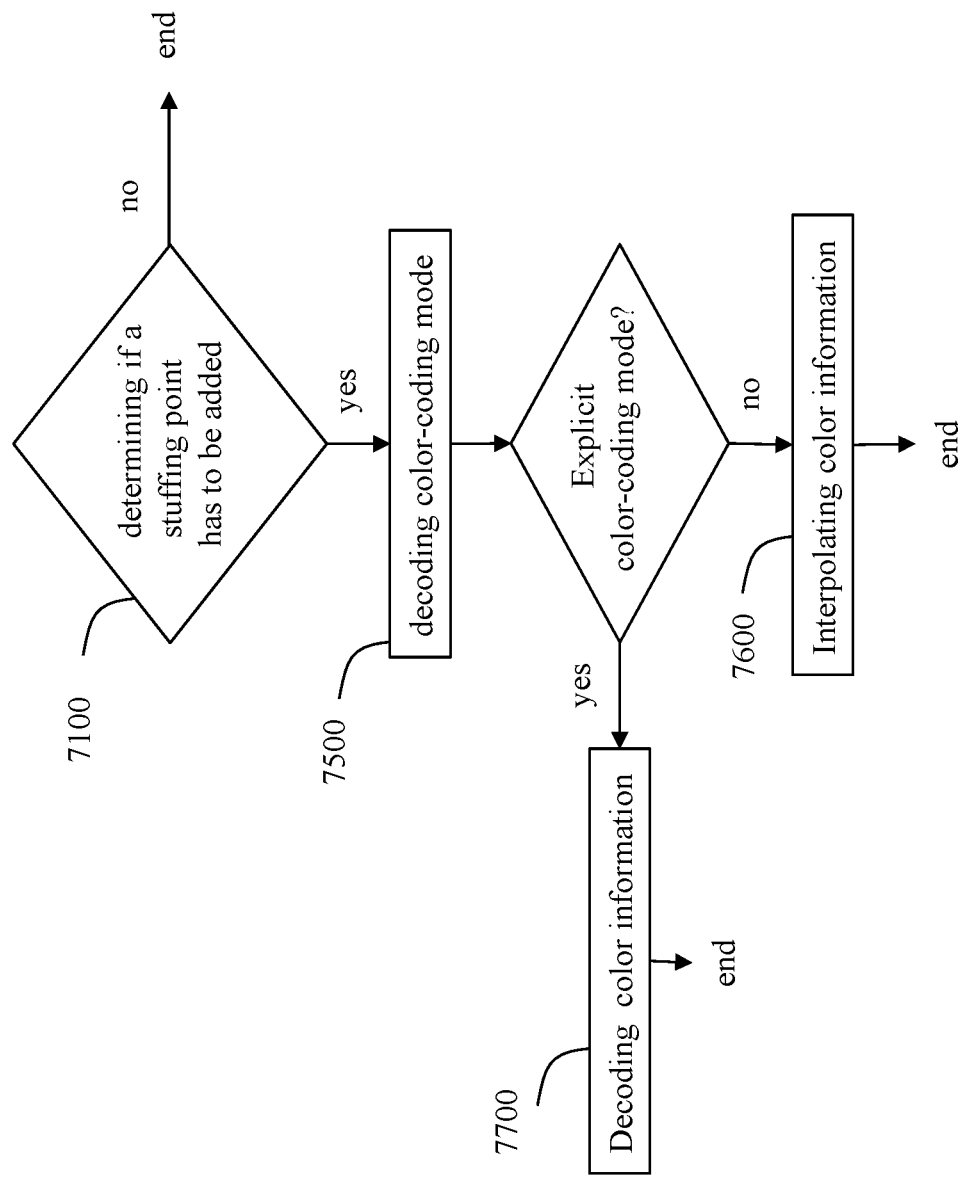
FIG. 7b illustrates a schematic block diagram of an example of a method for adding at least one stuffing 3D sample to a point cloud frame PCF in accordance with at least one of the present embodiments.
Figure 8:
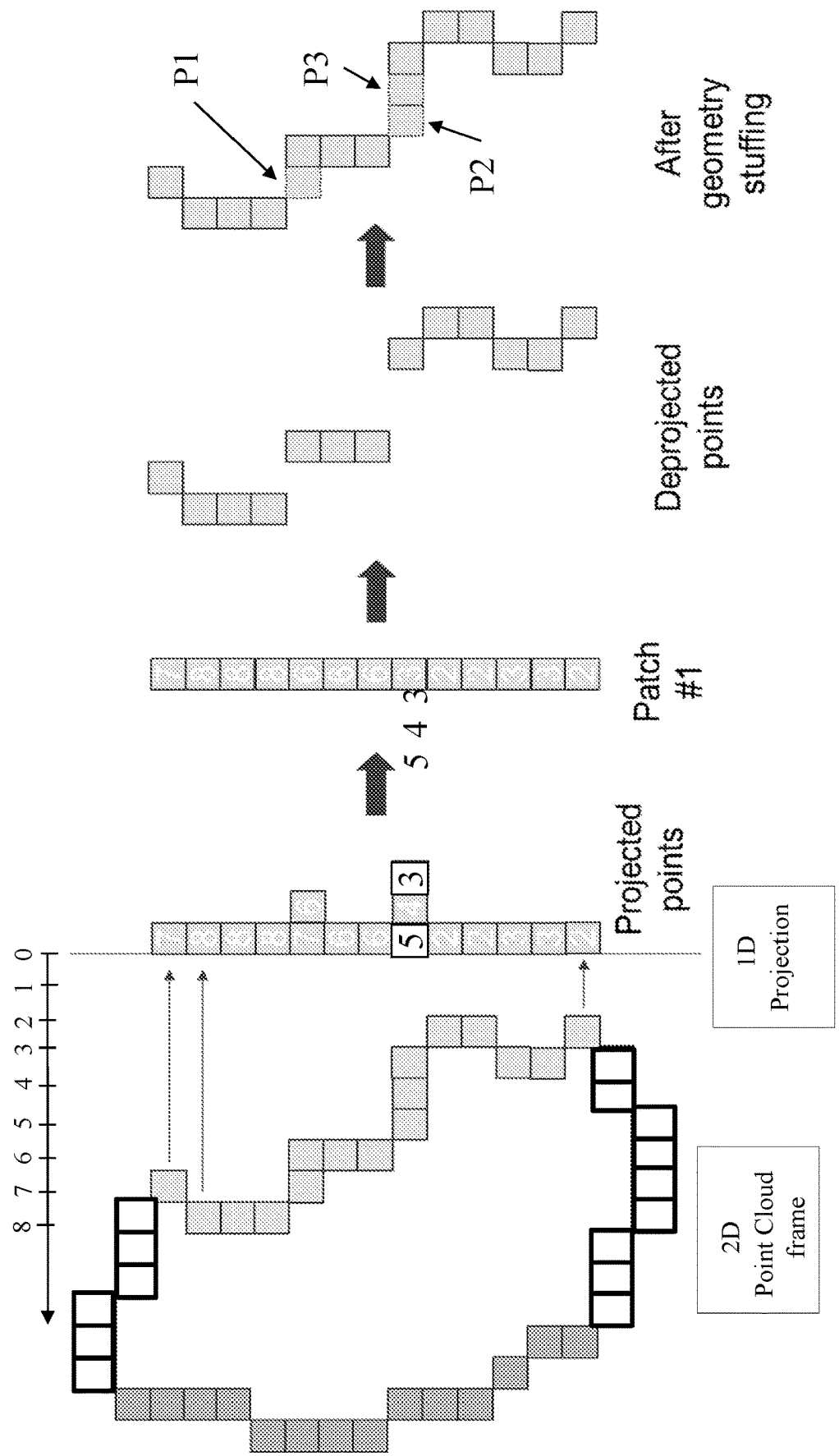
FIG. 8 illustrates schematically an example of a connected component of FIG. 3a in accordance with at least one embodiment of the method of FIG. 7.

The method of FIG. 7 is particularly advantageous in term of bitrate because using stuffing 3D samples reduces the number of geometry images (layers) required to properly capture the geometry of a point cloud frame as illustrated in FIG. 8. Thus, encoding a very limited number of geometry images and stuffing 3D samples reduces the overall bitrate compared to a method using only geometry images to capture the geometry of the point cloud frame.

FIG. 8 illustrates schematically an example of a connected component of FIG. 3a processed in accordance with at least one embodiment of the method of FIG. 7.

Instead of keeping (up to) three patches to capture all the projected information related to the first connected component represented by light grey rectangles (FIG. 3a), a single layer is kept (patch #1) according to the method of FIG. 7, for example the patch corresponding to the first layer, that is a layer that stores the depth values D0 associated with the 2D samples with the smallest depth. Said patch #1 is then de-projected and the de-projected connected component is analyzed to detect potential holes which are then filled in by at least one stuffing 3D sample. According to this example, three stuffing 3D samples P1, P2 and P3 are added.

According to an embodiment of step 7100, illustrated in FIG. 7a, adding a stuffing 3D sample comprises the following sub-steps:

In sub-step 7110, for at least one current 3D sample Cur of the point cloud PCF, a maximum depth difference (distance) deltaMax(Cur) is calculated between the depth value Depth(Cur) of the current 3D sample and the depth value Depth(Ni) of neighboring 3D samples Ni of said current 3D samples:

$$\text{deltaMax}(Cur) = \max(\text{Depth}(Ni) - \text{Depth}(Cur))$$

where Ni denotes an $i^{th}$ neighboring 3D sample of the current 3D sample Cur and max(a,b) is the usual maximum function between two values a and b.

According to an embodiment of sub-step 7110, a neighboring 3D sample Ni belongs to a N×N neighborhood centered around the current 3D sample.

According to a variant of sub-step 7110, the projection of a neighboring 3D sample Ni onto a geometry image plane and the projection of the current 3D sample Cur onto said geometry image plane belongs to a same patch of a same geometry image (same layer).

According to a variant of sub-step 7110, the projection of a neighboring 3D sample Ni onto a geometry image plane and the projection of the current 3D sample Cur onto said geometry image plane belong to different patches of a same geometry image (same layer).

According to a variant of sub-step 7110, the projection of a neighboring 3D sample Ni onto a first geometry image plane and the projection of the current 3D sample Cur onto a second geometry image plane, said first and second geometry image planes correspond to different geometry images (different layers). For example, one of said geometry image stores the depth values D0 associated with the 2D samples with the lowest depth (so-called first layer in V-PCC) and another of said geometry image stores the depth values D1 associated with the 2D samples with the highest depth (so-called second layer in V-PCC).

According to a variant of sub-step 7110, a difference between the depth value Depth(Cur) of a current 3D sample and the depth value Depth(Ni) of a neighboring 3D sample Ni is ignored if it does not belong to a given range of values defined by a lower bound LB and an upper bound UB.

For example, LB=0 and UB=4.

When none of the differences belongs to the given range of values, the maximum depth difference deltaMax(current) may be set to 0.

In sub-step 7120, at least one stuffing 3D samples is added with depth values ranging from Depth(Cur) to Depth(Cur)+ deltaMax(Cur)−1.

According to an embodiment of sub-step 7120, at least one stuffing 3D sample is added, at the same 2D location as the 2D sample representing the projection of a current 3D sample onto an image plane, up to the maximum depth difference deltaMax(Cur). Thus, (deltMax(Cur)−1) stuffing 3D samples are added with depth values ranging from Depth(Cur) to Depth(Cur)+deltaMax(Cur)−1.

When deltMax(Cur)=0 or =1, then a stuffing 3D sample is also added at said 2D location.

Figure 9:
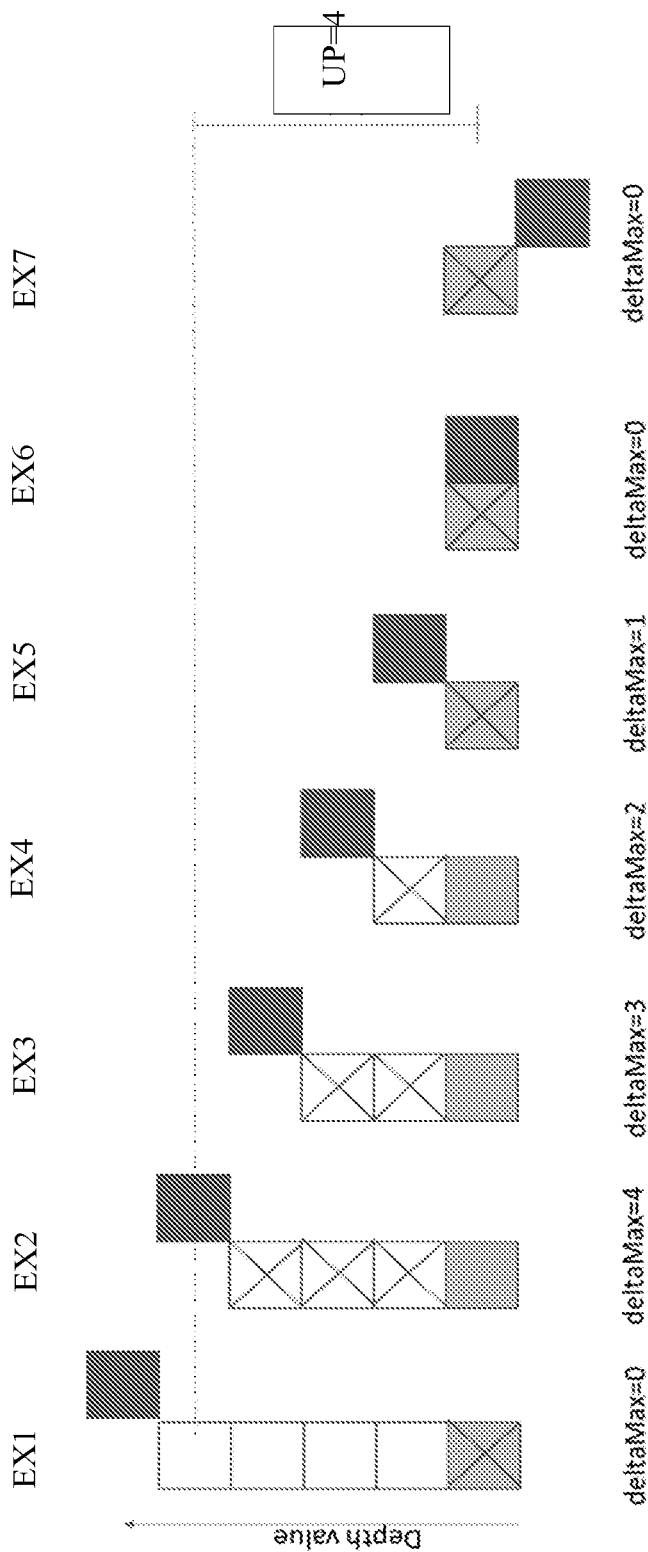
FIG. 9 illustrates schematically an example of the substep 7110.

FIG. 9 illustrates schematically an example of the sub-step 7110 when deltaMax(Cur) equals 0, 1, 2, 3 and 4.

The light grey rectangles represent a current 3D sample Cur, a block rectangle represents a neighboring 3D sample Ni and a cross is for an added stuffing 3D sample. It is assumed that a current 3D sample Cur has a single neighboring 3D sample Ni for easier illustrative examples.

In a first example EX1 of FIG. 9, the difference between the depth Depth(Cur) and the depth Depth(Ni) equals 5 and is greater than the upper bound UP (=4). Then, deltMax(Cur)=0 and a single stuffing 3D sample is added as the 2D location of the 2D sample representing of the projection of the current 3D sample.

In a second example EX2 of FIG. 9, the difference between the depth Depth(Cur) and the depth Depth(Ni) equals 4. Thus, deltMax(Cur)=4 and three stuffing 3D samples are added at the same 2D location as the current 3D sample Cur (up to the maximum depth difference deltaMax(Cur)−1).

In a third example EX3 of FIG. 9, the difference between the depth Depth(Cur) and the depth Depth(Ni) equals 3. Thus, deltMax(Cur)=3 and two stuffing 3D samples are added at the same 2D location as the current 3D sample Cur (up to the maximum depth difference deltaMax(Cur)−1).

In a fourth example EX4 of FIG. 9, the difference between the depth Depth(Cur) and the depth Depth(Ni) equals 2. Thus, deltMax(Cur)=2 and one stuffing 3D sample is added at the same 2D location as the current 3D sample Cur (up to the maximum depth difference deltaMax(Cur)−1).

In a fifth example EX5 of FIG. 9, the difference between the depth Depth(Cur) and the depth Depth(Ni) equals 1. Thus, deltMax(Cur)=1 and a single stuffing 3D sample is added as the 2D location of the 2D sample representing of the projection of the current 3D sample.

In a sixth example EX6 of FIG. 9, the difference between the depth Depth(Cur) and the depth Depth(Ni) equals 0. Thus, deltMax(Cur)=0 and a single stuffing 3D sample is added as the 2D location of the 2D sample representing of the projection of the current 3D sample.

In a seventh example EX7 of FIG. 9, the lower bound LB equals 0 and the upper bound equals 4. The difference between the depth Depth(Cur) and the depth Depth(Ni) equals −1. Thus, deltMax(Cur)=0 and a single stuffing 3D sample is added as the 2D location of the 2D sample representing of the projection of the current 3D sample.

According to another embodiment of sub-step 7120, at least one stuffing 3D sample is added, at the same 2D location as the 2D sample representing the projection of a current 3D sample onto the image plane, up to the maximum depth difference deltaMax(Cur)−1, and another stuffing 3D sample is added at the 2D location as a 2D sample representing the projection of the neighboring 3D sample with a depth value equals to deltMax(Cur)−1. Thus, (deltMax(Cur)−1) stuffing 3D samples are added with depth values ranging from Depth(Cur) to Depth(Cur)+deltaMax(Cur)−1.

Figure 10:
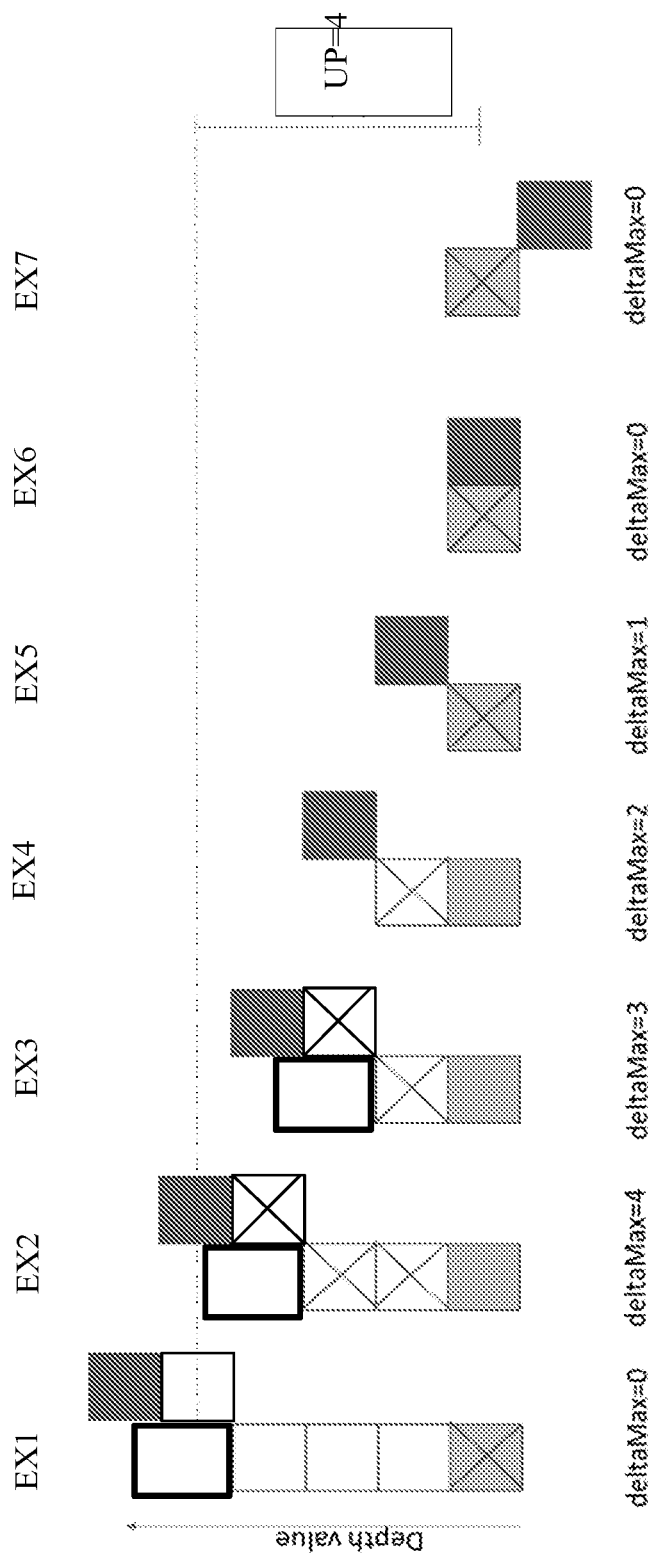
FIG. 10 illustrates schematically an example of the substep 7110.

FIG. 10 illustrates schematically an example of the sub-step 7110 when deltaMax(Cur) equals 0, 1, 2, 3 and 4.

The light grey rectangles represent a current 3D sample Cur, a block rectangle represents a neighboring 3D sample Ni and a cross is for an added stuffing 3D sample. It is assumed that a current 3D sample Cur has a single neighboring 3D sample Ni for easier illustrative examples.

In a second example EX2 of FIG. 10, the difference between the depth Depth(Cur) and the depth Depth(Ni) equals 4. Thus, deltMax(Cur)=4, two stuffing 3D samples are added at the same 2D location as the current 3D sample Cur (up to the maximum depth difference deltaMax(Cur)−2) and another stuffing 3D sample is added at the 2D location as the 2D sample representing the projection of the neighboring 3D sample that set deltMax(Cur)−1.

In a third example EX3 of FIG. 10, the difference between the depth Depth(Cur) and the depth Depth(Ni) equals 3. Thus, deltMax(Cur)=3, one stuffing 3D samples is added at the same 2D location as the current 3D sample Cur (up to the maximum depth difference deltaMax(Cur)−2) and another stuffing 3D sample is added at the 2D location as the 2D sample representing the projection of the neighboring 3D sample that set deltMax(Cur)−1. The other examples remain the same as those described in FIG. 9.

According to a variant of sub-step 7120, the maximum depth difference deltaMax(Cur) is at least equal to a minimum value minDepth:

$$\text{deltaMax(Cur)} = \max((\text{Depth}(Ni) - \text{Depth}(Cur)), \text{minDepth})$$

For example, minDepth may equal to 1 or 2.

This variant ensures a minimal thickness of a reconstructed point cloud frame by adding, if necessary, at least one stuffing 3D sample.

According to a variant of sub-step 7120, the value of minDepth may be defined by a Rate/Distorsion Optimization loop by estimating the cost of encoding at least one added stuffing 3D sample.

According to an embodiment of sub-step 7120, the minimum value MinDepth is transmitted (signaled) in a bitstream.

According to an embodiment of step 7300, if an explicit color-coding mode is assigned to a stuffing 3D sample, said color information is encoded in the texture image TI.

This maximizes fidelity and reduces decoding complexity.

According to an embodiment of step 7200, a value of a color-coding mode is assigned to a stuffing 3D sample Cur according to the maximum depth difference deltaMax(Cur) associated with said stuffing 3D sample Cur.

According to an embodiment of step 7200, if the maximum depth difference deltaMax(Cur) equals 0 or 1, then assigning the explicit color-coding mode to the stuffing 3D sample to be added. If the maximum depth difference deltaMax(Cur) is larger than 1, then assigning the explicit color-coding mode to the added stuffing 3D sample with the highest depth value. The added stuffing 3D sample with the highest depth value is the added stuffing 3D sample with a depth value equals to Depth(Cur)+deltaMax(Cur)−1. Then, assigning the implicit color-coding mode to the remaining added stuffing 3D samples (if exist).

Figure 11:
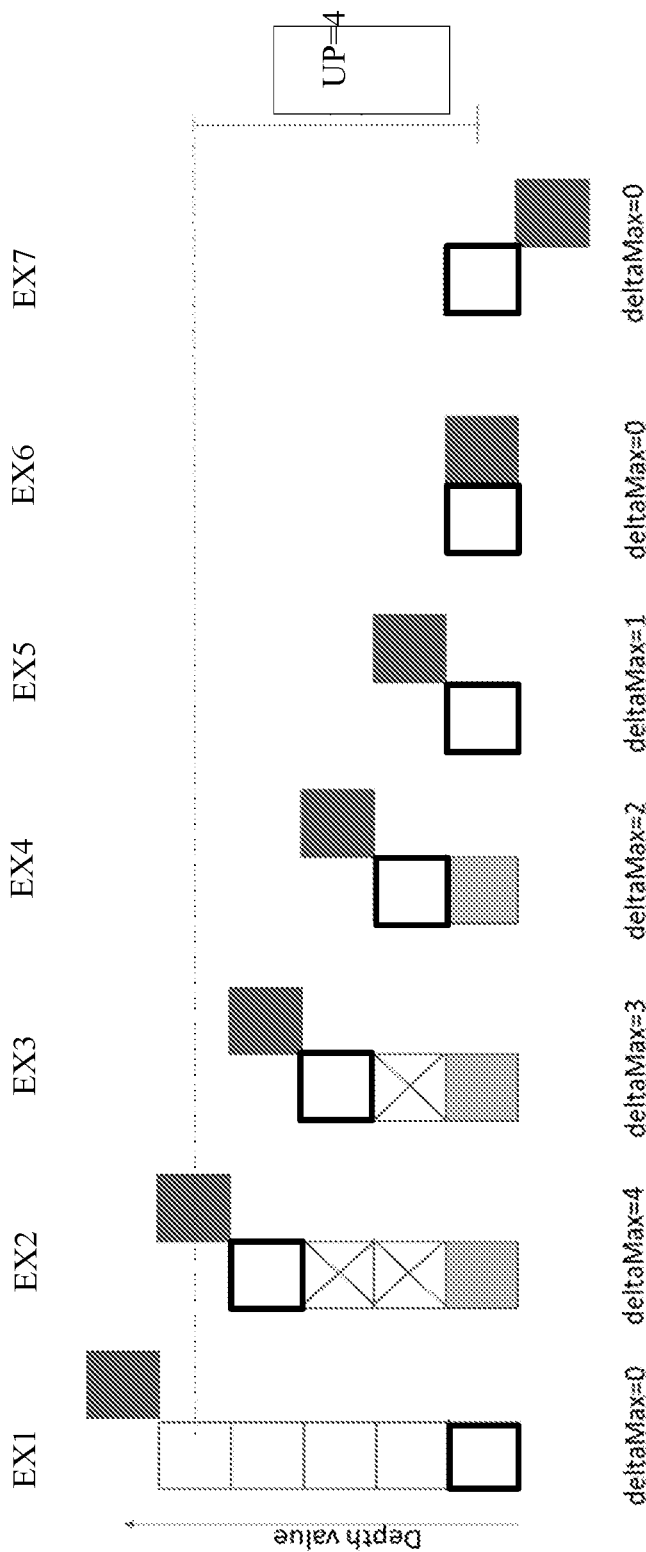
FIG. 11 illustrates schematically an example of a variant of an embodiment of step 7200.

FIG. 11 illustrates schematically an example of an embodiment of step 7200 when deltaMax(Cur) equals 0, 1, 2, 3 and 4.

The light grey rectangles represent a current 3D sample Cur, a block rectangle represents a neighboring 3D sample Ni, a cross is for an added stuffing 3D sample and hashed rectangles represent added stuffing 3D samples with a color-coding set to explicit. It is assumed that a current 3D sample Cur has a single neighboring 3D sample Ni for easier illustrative examples.

Seven examples of FIG. 9 are used here for none limitative examples.

In a first, sixth and seventh examples of FIG. 11 (EX1, EX6 and EX7), the maximum depth difference deltaMax (Cur) equals 0 then the explicit color-coding mode is assigned to the stuffing 3D sample located at the 2D location of the 2D sample representing the projection of a current 3D sample Cur.

In the second example EX2 of FIG. 11, the maximum depth difference deltaMax(Cur) equals 4, then the explicit color-coding mode is assigned to the added stuffing 3D sample with the highest depth value, that is the added stuffing 3D sample with a depth value equals to Depth(Cur)+3. The implicit color-coding mode is assigned to the added stuffing 3D sample with a depth value equals to Depth(Cur)+2, and to the added stuffing 3D sample with a depth value equals to Depth(Cur)+1.

In the third example EX3 of FIG. 11, the maximum depth difference deltaMax(Cur) equals 3, then the explicit color-coding mode is assigned to the added stuffing 3D sample with the highest depth value, that is the added stuffing 3D sample with a depth value equals to Depth(Cur)+2. The implicit color-coding mode is assigned to the added stuffing 3D sample with a depth value equals to Depth(Cur)+1.

In the fourth example EX4 of FIG. 11, the maximum depth difference deltaMax(Cur) equals 2, then the explicit color-coding mode is assigned to the added stuffing 3D sample with the highest depth value, that is the added stuffing 3D sample with a depth value equals to Depth(Cur)+1.

In the fifth example EX5 of FIG. 11, the maximum depth difference deltaMax(Cur) equals 1, then the explicit color-coding mode is assigned to the added stuffing 3D sample with the highest depth value, that is the added stuffing 3D sample with a depth value equals to Depth(Cur).

Figure 12:
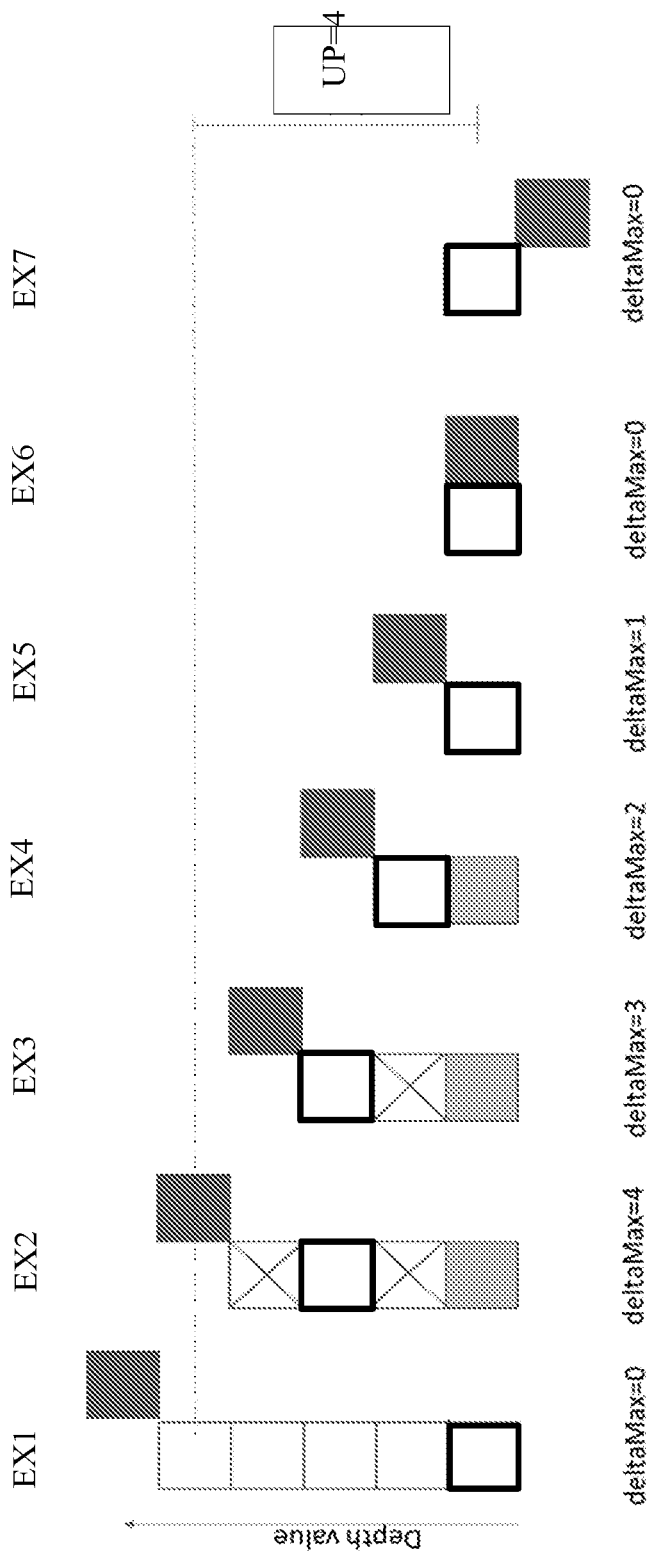
FIG. 12 illustrates schematically an example of a variant of an embodiment of step 7200.

According to a variant embodiment of step 7200, illustrated in FIG. 12, if the maximum depth difference deltaMax (Cur) equals 0 or 1, then the explicit color-coding mode is assigned to the stuffing 3D sample to be added. If the maximum depth difference deltaMax(Cur) is larger than 1, then assigning the explicit color-coding mode to the added stuffing 3D sample with the middle depth value. The added stuffing 3D sample with the middle depth value is the added stuffing 3D sample with a depth value equals to ceil(Depth (Curr)+deltaMax(Curr)/2). Then, assigning the implicit color-coding mode to the remaining added stuffing 3D samples (if exist).

According to an embodiment of step 7300, if the color-coding mode associated with a stuffing 3D sample does not indicate that a color information is associated with said stuffing 3D sample, the color information associated with a stuffing 3D sample is obtained by interpolating color information associated with neighboring 3D samples Ni of said stuffing 3D sample.

This embodiment is lowering the bitrate.

FIG. 7b illustrates a schematic block diagram of an example of a method for adding at least one 3D sample (denoted stuffing 3D sample) to a point cloud frame PCF in accordance with at least one of the present embodiments.

In step 7100, described above, the module determines if at least one stuffing 3D sample has to be added to a point cloud frame PCF.

If a stuffing 3D sample has to be added, in step 7500, a decoder decodes a bitstream to provide a color-coding mode associated with said at least one stuffing 3D sample.

If said color-coding mode indicates that a color information associated with said stuffing 3D sample is explicitly encoded, in step 7600, a decoder decodes a bitstream to provide a color information associated with said at least one stuffing 3D sample.

If said color-coding mode is implicit, in step 7700, a module derives a color information from color information associated with other 3D samples including 3D samples of the point cloud frame PCF and possibly other stuffing 3D samples.

The embodiments and variants of step 7100, illustrated in FIG. 7a apply for the method of FIG. 7b.

Additionally, the method of FIG. 7b comprises decoding a bitstream to provide a minimum value minDepth.

Any well-known interpolation function may be used to interpolate color information associated with neighboring 3D samples of a stuffing 3D samples.

For example, a color interpolation function may be the maximum, minimum, median or average of color information associated with the neighboring 3D samples Ni. A weighted average may also be used with weights defined from the neighbor distance.

Another example of a color interpolation function is given by the following pseudo-code:

| Original | <=>Frame | KdTreeFrame |
| Reconstructed | <=> Approximation = | KdTreeRefined |
| (smooth) | ⇔ | |

RefinedColor1=list of colors of the nearest 3D sample (point) in the original frame from the reconstructed one (one color per reconstructed 3D sample)
RefinedColor2=list of colors of nearest 3D sample (point) in the reconstructed frame from the original one (one list of n colors per reconstructed 3D sample)

| Original | | Reconstructed | Color 1 | Color 2 |
|---|---|---|---|---|
| 0 | x ←--------------------- x | 0 | 0 | 0 |
| 1 | x ←--------------------- x | 1 | 1 | 1 |
| 2 | x ←--------------------- x | 2 | 2 | 2, 3, 4 |
| 3 | x | | | |
| 4 | x | | | |
| 5 | x | | | |
| 6 | x | | | |
| 7 | x ←--------------------- x | 3 | 7 | 5, 6, 7 |
| 8 | x ←--------------------- x | 4 | 8 | 8 |
| 9 | x ←--------------------- x | 5 | 9 | 9, 10 |
| 10 | x | | | |
| 11 | x | | | |
| 12 | x ←--------------------- x | 6 | 12 | 11, 12 |

Algorithm

```
//compute color0
Centroid1 = color1
Centroid2 = 1/n Σ_{k-1}^{n}(2^k) with c ∈ {r, g, b}
D2 = var(Centroid2) = Σ_{k-1}^{n}(c2^k - c̄)
r = nb_reconstructed_point / nb_original_points
Delta2 = (Centroid1 − Centroid2)^2
w =0;
if ( Delta2 != 0) {
   alpha = D2/delta2;
   a = nb_color2 * r − 1;
   c = alpha * r − 1;
```

```
delta = 1 - a *c ;
w = 0
if (delta != 0) {
    w = (-1 + √delta )/ a ;
}
}
Color0 = w * Centroid1 + (1 - w) Centroid2
//color adjustment and selection step= s = ⎛s_r⎞
          ⎜s_g⎟  with sr, sg, sb ∈ [-2, +2]
          ⎝s_b⎠

Loop over step (5x5x5 combinations for each reconstructed point)
{
    e1 = Σ_{k=1}^m (c0^k + s^k) - c1^k)^2 with m = 3 (r,g,b)
    e2 = Σ_{i=0}^n Σ_{k=0}^m (c0^{k,i} + s^{k,i}) - c1^{k,1})^2 with m =3 (r,g,b) and n = number
    of C2 colors for the current point
    error = max (e1, e2)
    if (error < min_error) {
        best_color = color0 + step
    }
}
```

The algorithm presented above as pseudo-code performs the following steps for each current 3D sample from a reconstructed point cloud requiring color interpolation:

Finding the color and location of the closest, colored 3D sample in the reconstructed point cloud frame, for example IRPCF;

Finding the color and location of the closest, colored 3D sample in an original point cloud frame, for example IPCF;

Averaging the colors of all 3D samples based on their distance to a centroid (calculated by averaging the geometry coordinates of said 3D samples);

Assigning such average color to the current 3D sample; and

Modifying color of current 3D sample (within a+1-2 difference per color component) such the error with the original 3D sample is minimized.

The methods of FIG. 7 (encoding) and 7b (decoding) may be used in different use cases.

In a first use case, a single geometry image (layer) may be used to encode the geometry of the point cloud frame PCF. For example, said single geometry image may store the depth values D0 associated with the 2D samples with the lowest depth. Next, at least one stuffing 3D sample may be added according to the method of FIG. 7 or 7b. Finally, the color information associated with the 3D samples of the point cloud PCF may be encoded as a first texture image TI0 and the color information associated with at least one stuffing sample is encoded as a second texture image TI1 when an explicit color-coding mode is assigned to said at least one stuffing 3D sample.

In a second use case, two geometry images GI0 and GI1 (two layers) may be used to encode the geometry of the point cloud frame PCF. For example, the first geometry image may store the depth values D0 associated with the 2D samples with the lowest depth (first layer) and the second geometry image GI1 may store the depth values D1 associated with the 2D samples with the highest depth (second layer). Next, at least one stuffing 3D sample may be added according to the method of FIG. 7 or 7b. Finally, the color information associated with the 3D samples of the point cloud PCF may be encoded as two texture image TI0 and TI1. The first texture image TI1 encodes the color information relative to the first geometry image GI0 and the second texture image TI1 encodes the color information relative to the second geometry image GI1. A third texture image TI2 may encode the color information associated with at least one stuffing sample when an explicit color-coding mode is assigned to said at least one stuffing 3D sample.

In FIG. 1-12, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 6010 or by hardware, or by a combination of hardware and software. As a non-limiting example, the embodiments may be also implemented by one or more integrated circuits. The memory 6020 may be of any type appropriate to the technical environment and may be implemented using any appropriate data storage technology, such as optical memory devices, magnetic memory devices, semiconductor-based memory devices, fixed memory, and removable memory, as non-limiting examples. The processor 6010 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application, for example, minDepth or surface thickness. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame in order to produce a final output suitable for display. In various embodiments, such processes include one or more of the processes typically performed by an image-based decoder.

As further examples, in one embodiment "decoding" may refer only to entropy decoding, in another embodiment "decoding" may refer only to differential decoding, and in another embodiment "decoding" may refer to a combination of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an image-based decoder.

As further examples, in one embodiment "encoding" may refer only to entropy encoding, in another embodiment "encoding" may refer only to differential encoding, and in another embodiment "encoding" may refer to a combination of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, the term "adding a stuffing 3D sample" means including a 3D sample in a point cloud frame. For example, when 3D samples of a point cloud are stored as elements of a table, array, adding a stuffing 3D sample means storing information defining said stuffing 3D sample in a new element of said table (array).

Additionally, the term "stuffing" indicates that a 3D sample is creared according to at least one of the present embodiments.

Additionally, the term "assigning" an information (for example a color information or a color-coding mode) to a 3D sample means associating said information with said 3D sample, that is, for example, associating in a table (array) or any other means.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular a color-coding mode to said at least one stuffing 3D sample, said color-coding mode indicating if the color information assigned to said at least one stuffing 3D sample is explicitly encoded in a bitstream or if said color information is implicit, that is interpolated. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:
1. A method comprising:
adding at least one 3D sample to a point cloud frame, said at least one 3D sample being added according to a difference between a depth value of at least one neighboring 3D sample of a current 3D sample of the point cloud frame and a depth value of said current 3D sample, wherein the difference between the depth value of the neighboring 3D sample and the depth value of said current 3D sample is a first depth difference determined as a maximum depth difference between depth values of neighboring 3D samples of the current 3D sample and the depth value of the current 3D sample, and wherein at least one 3D sample is added with a depth value belonging to a range from the depth value of the current 3D sample of said point cloud frame and a depth value being equal to the sum of the depth value of said current 3D sample and the first depth difference minus 1.

2. The method of claim 1, wherein said point cloud frame is obtained by de-projecting at least one geometry image representing the geometry of a point cloud frame.

3. The method of claim 1, wherein at least one 3D sample is added, at the same 2D location as a 2D sample representing the projection of said current 3D sample of said point cloud frame onto an image plane, up to the first depth difference.

4. The method of claim 3, wherein responsive to a determination that the first depth difference equals 0 or 1, a 3D sample is added at said 2D location.

5. The method of claim 1, wherein at least one 3D sample is added, at the same 2D location as a 2D sample representing the projection of said current 3D sample of said point cloud frame onto an image plane, up to the first depth difference minus 1, and another 3D sample is added at the 2D location as a 2D sample representing the projection of the neighboring 3D sample having a depth value equals to the first depth difference minus 1.

6. The method of claim 1, wherein said first depth difference is equal to or higher than a first value.

7. The method of claim 6, wherein said first value is greater or equal to 1 or 2.

8. The method of claim 6, wherein said first value is transmitted in a bitstream.

9. The method of claim 6, wherein the method further comprises decoding a bitstream to provide said first value.

10. The method of claim 1, wherein when determining the maximum depth difference between depth values of neighboring 3D samples of the current 3D sample and the depth value of the current 3D sample, a difference between the depth value of the current 3D sample of the point cloud frame and the depth value of a neighboring 3D sample is ignored if said difference does not belong to a first range of values.

11. The method of claim 1 comprising:
assigning a color-coding mode to at least one added 3D sample, said color-coding mode indicating that color information associated with said at least one added 3D sample is encoded in a bitstream; and
encoding in a bitstream the color information associated with said at least one 3D sample.

12. The method of claim 11, wherein said color-coding mode is assigned to said 3D sample according to said first depth difference associated with said 3D sample.

13. A non-transitory computer-readable medium including instructions which, when executed by a computer, cause the computer to carry out the method of claim 1.

14. A device comprising at least one processor configured to:
add at least one 3D sample to a point cloud frame, said at least one 3D sample being added according to a difference between a depth value of at least one neighboring 3D sample of a current 3D sample and the depth value of said current 3D sample, wherein the difference between the depth value of the neighboring 3D sample and the depth value of said current 3D sample is a first depth difference determined as a maximum depth difference between depth values of neighboring 3D samples of the current 3D sample and the depth value of the current 3D sample, and wherein at least one 3D sample is added with a depth value belonging to a range from the depth value of the current 3D sample of said point cloud frame and a depth value being equal to the sum of the depth value of said current 3D sample and the first depth difference minus 1.

15. The device of claim 14, wherein at least one 3D sample is added, at the same 2D location as a 2D sample representing the projection of said current 3D sample of said point cloud frame onto an image plane, up to the first depth difference.

16. The device of claim 14, wherein said first depth difference is equal to or higher than a first value.

17. The device of claim 16, wherein the at least one processor is further configured to decode a bitstream to provide said first value.

18. The device of claim 14, wherein when determining the maximum depth difference between depth values of neighboring 3D samples of the current 3D sample and the depth value of the current 3D sample, a difference between the depth value of the current 3D sample of the point cloud frame and the depth value of a neighboring 3D sample is ignored if said difference does not belong to a first range of values.

19. The device of claim 14, wherein the at least one processor is further configured to:
assign a color-coding mode to at least one added 3D sample, said color-coding mode indicating that color information associated with said at least one added 3D sample is encoded in a bitstream; and
encode in a bitstream the color information associated with said at least one 3D sample.

* * * * *